US012709072B2

(12) United States Patent
Kim et al.

(10) Patent No.: US 12,709,072 B2
(45) Date of Patent: Aug. 18, 2026

(54) FILM ADHESION APPARATUS FOR A HOUSING OF AN ELECTRONIC APPARATUS

(71) Applicants: Samsung Electronics Co., Ltd., Suwon-si (KR); JM TECHNOLOGY CO., LTD., Gumi-si (KR)

(72) Inventors: Jisung Kim, Suwon-si (KR); Hankil Park, Suwon-si (KR); Sehwan Hong, Suwon-si (KR); Myeonggeun Lee, Gumi-si (KR); Seongjin Jeong, Gumi-si (KR)

(73) Assignees: SAMSUNG ELECTRONICS CO., LTD., Suwon-si (KR); JM TECHNOLOGY CO., LTD., Gumi-si (KR)

( * ) Notice: Subject to any disclaimer, the term of this patent is extended or adjusted under 35 U.S.C. 154(b) by 182 days.

(21) Appl. No.: 18/590,206

(22) Filed: Feb. 28, 2024

(65) Prior Publication Data

US 2024/0198604 A1 Jun. 20, 2024

Related U.S. Application Data

(63) Continuation of application No. PCT/KR2022/095137, filed on Oct. 19, 2022.

(30) Foreign Application Priority Data

Oct. 19, 2021 (KR) ........................ 10-2021-0139728

(51) Int. Cl.
*B29C 65/00* (2006.01)
*B29C 63/00* (2006.01)
(Continued)

(52) U.S. Cl.
CPC ...... *B29C 66/8362* (2013.01); *B29C 63/0004* (2013.01); *B29C 63/22* (2013.01); *B29L 2031/3437* (2013.01)

(58) Field of Classification Search
CPC ............ B32B 37/0053; B32B 38/1866; B32B 37/003; B32B 37/10; B29C 66/8362;
(Continued)

(56) References Cited

U.S. PATENT DOCUMENTS

2014/0377508 A1* 12/2014 Oh .......................... B32B 37/10 156/60
2020/0368974 A1 11/2020 Choung et al.
2023/0014521 A1* 1/2023 Jeong .................. B29C 65/7802

FOREIGN PATENT DOCUMENTS

CN 109648979 A 4/2019
CN 110722786 A * 1/2020 ......... B29C 63/0073
(Continued)

OTHER PUBLICATIONS

International Search Report for PCT/KR2022/095137 mailed Feb. 3, 2023, 4 pages.
(Continued)

*Primary Examiner* — Carson Gross
(74) *Attorney, Agent, or Firm* — Nixon & Vanderhye P.C.

(57) ABSTRACT

Disclosed is a film attachment apparatus for a housing of an electronic apparatus. The film attachment apparatus according to various embodiments, which adheres a film on the surface of a housing plate in an electronic apparatus having an edge portion having a curve, comprises: a jig configured to mount and fix the housing plate; a roller configured to press the film with respect to the housing plate; a vertical driving portion configured to move the roller from the upper portion to the lower portion of the surface of the housing plate, to which the film is adhered, and to press the roller with respect to the film; and a horizontal driving portion
(Continued)

configured to move the roller from the surface of the housing plate in the direction toward the edge portion of the housing plate.

13 Claims, 21 Drawing Sheets

(51) Int. Cl.
*B29C 63/22* (2006.01)
*B29L 31/34* (2006.01)

(58) Field of Classification Search
CPC . B29C 66/342; B29C 66/345; B29C 63/0047; Y10T 156/1028
See application file for complete search history.

(56) References Cited

FOREIGN PATENT DOCUMENTS

| | | | | | |
|---|---|---|---|---|---|
| CN | 111823558 | A | | 10/2020 | |
| CN | 111823559 | A | | 10/2020 | |
| CN | 112659534 | A | | 4/2021 | |
| JP | 2001042315 | A | | 2/2001 | |
| KR | 101471819 | B1 | | 12/2014 | |
| KR | 20150068014 | A | | 6/2015 | |
| KR | 101651327 | B1 | | 8/2016 | |
| KR | 101687338 | B1 | | 12/2016 | |
| KR | 20170008508 | A | | 1/2017 | |
| KR | 20170035645 | A | | 3/2017 | |
| KR | 20170039785 | A | | 4/2017 | |
| KR | 101765553 | B1 | | 8/2017 | |
| KR | 20180113736 | A | | 10/2018 | |
| KR | 20190094867 | A | | 8/2019 | |
| KR | 20190103830 | A | | 9/2019 | |
| KR | 102055163 | B1 | | 12/2019 | |
| KR | 20200004951 | A | | 1/2020 | |
| KR | 20200139508 | A | * | 12/2020 | ............. B32B 38/18 |

OTHER PUBLICATIONS

Written Opinion of the ISA for PCT/KR2022/095137 mailed Feb. 3, 2023, 5 pages.

* cited by examiner 302a
320
310
370
316
318
317
311
330
381
380
360

310
316a
316
318
317
311
311
313
312
313
312
311
313
316
318
317
316a 401
402
403
330
380
333
341a
342

FILM ADHESION APPARATUS FOR A HOUSING OF AN ELECTRONIC APPARATUS

CROSS-REFERENCE TO RELATED APPLICATIONS

This application is a continuation of International Application No. PCT/KR2022/095137 designating the United States, filed on Oct. 19, 2022, in the Korean Intellectual Property Receiving Office and claiming priority to Korean Patent Application No. 10-2021-0139728, filed on Oct. 19, 2021, in the Korean Intellectual Property Office. The disclosures of each of which are incorporated by reference herein in their entireties.

BACKGROUND

Field

The disclosure relates to an electronic device manufacturing device and, for example, to a film attachment device for a housing of an electronic device.

Description of Related Art

The housing of an electronic device, such as a mobile phone, may include a housing plate configured to protect the front surface and/or rear surface of the electronic device with reference to the position of a display. The housing plate may include a metal material, a glass material, and/or a polymer material. The housing plate may have an edge part processed in a curved shape in order to improve the aesthetic appearance of the electronic device and to facilitate the user's grip. A film may be attached to the inner surface of the housing plate.

The film may be a sealing member for providing a waterproof performance of the housing plate, or an insulative film for preventing/reducing a short circuit caused by a contact between the metallic housing plate and an electric component inside the electronic device. In addition, when the housing plate includes a transparent material such as glass or polymer, an opaque film may be attached to assign a design element such as a color and/or a pattern or to prevent/reduce the inside of the electronic device from being seen from the outside.

The film may have a flexible synthetic material. An adhesive may be applied to a surface of the film facing the inner surface of the housing plate. The film having an adhesive applied thereto may be pressurized against the inner surface of the housing plate such that the film is coupled to the inner surface of the housing plate.

When a film is attached to a housing plate having an edge portion processed in a curved shape, the film may detach from the edge portion, or the degree of attachment may degrade, thereby generating bubbles, if the film is vertically pressurized and attached thereto while the edge portion has a small radius of curvature or has a large height.

SUMMARY

Embodiments of the disclosure may provide a film attachment device capable of attaching a film to a housing plate having a small radius of curvature with a high degree of attachment.

A film attachment apparatus according to various example embodiments of the disclosure may include a film attachment apparatus for attaching a film onto a surface of a housing plate of an electronic apparatus, the surface including an edge part including a curved surface, and may include: a jig configured to seat and fix the housing plate, a roller configured to press the film to the housing plate, a vertical drive part configured to move the roller from above the surface of the housing plate, to which the film is attached, to therebelow, and press the roller to the film, and a horizontal drive part configured to move the roller in the direction of the edge part of the housing plate from the surface of the housing plate. In various example embodiments, the film attachment apparatus may include multiple rollers arranged in parallel, and the horizontal drive part may be configured to move the multiple rollers in the directions of multiple edge parts of the housing plate, respectively, which face each other.

In various example embodiments, a radius of the roller may be less than a radius of curvature of the curved surface of the edge part. In various example embodiments, the roller may have a radius less than the radius of curvature of the curved surface of the edge part by at least 0.5 mm.

In various example embodiments, the film attachment apparatus may include: a roller carriage configured to support the roller, slidably coupled in the direction of the edge part of the housing plate with respect to a lifting/lowering plate, and configured to be driven by the horizontal drive part to move the roller to the edge part of the housing plate. In various example embodiments, the roller carriage may include an elastic member comprising an elastic material which allows the roller to move in a vertical direction with reference to the direction of the surface of the housing plate. In various example embodiments, the roller may include a roll body configured to downwardly press the film to the housing plate, and a journal part including a part having a diameter less than the diameter of the roll body and is configured to transmit, to the roller carriage, a reaction force against the downward pressing of the roller, and the roller carriage may include a bearing case configured to surround the journal part to support a rotation of the roller, and coupled to the elastic member to support the roller.

In various example embodiments, the roller may include two journal parts positioned at opposite terminal end parts of the roller, and the roller carriage may include bearing cases arranged at positions corresponding to the positions of the journal parts. In various example embodiments, the roller may include journal parts formed at opposite ends and the middle of the roller and include a roll body divided by the journal part positioned at the middle of the roller, and the roller carriage may include bearing cases arranged at positions corresponding to the positions of the journal parts.

In various example embodiments, the roll body of the roller may include a core part positioned at the central part of the roller, and an elastic polymer material configured to surround the outer circumferential surface of the core part.

In various example embodiments, the roller carriage may be detachably fastened to the lifting/lowering plate.

In various example embodiments, the jig may include a seat surface on which the housing plate is seated, and a suction hole formed on the seat surface and configured to suction the housing plate in a vacuum to fix the housing plate on the seat surface.

In various example embodiments, the film attachment apparatus may include: a release sheet to which the film is attached, the jig may include a release sheet guide configured to fix the release sheet in at least one direction on a plane, and the release sheet may include a guide hole disposed in an area corresponding to the release sheet guide in the perimeter part of the film. In various example embodiments, the guide hole of the release sheet may include a lengthened hole extending in the direction in which the roller moves when the film is attached. The release sheet may include a perforated line formed by cutting an edge of the lengthened hole in a direction from the inside of the lengthened hole to the outside of the release sheet.

In various example embodiments, the film attachment apparatus may include a jig base positioned below the jig and to which the jig is detachably fastened. In various example embodiments, a jig rail configured to slide and move the jig base and the jig fastened to the jig base to be inserted into and withdrawn from the lower part of the roller, may be included therein. In various example embodiments, the film attachment apparatus may include a shock absorber disposed and configured to come into contact with the jig based on the jig base being inserted into a lower part of the roller, and configured to absorb the kinetic energy of sliding-motion of the jig base to stop the jig base and to absorb the stop impact of the jig. In various example embodiments, the film attachment apparatus may include a jig sensor configured to recognize a signal of a state where the jig is inserted into the lower part of the roller, and the jig base may include a sensor detection-aiding part recognized by the jig sensor.

In various example embodiments, the film attachment apparatus may be configured to perform a jig sensor detection operation in which the jig sensor detects the jig base inserted into the lower part of the roller, a vertical drive part lowering operation in which based on the jig sensor detecting the jig base, the vertical drive part is configured to lower the roller to cause the roller to come into contact with the housing plate, a horizontal rolling operation in which the horizontal drive part horizontally is configured to move the roller to attach the film to the housing plate, a horizontal drive part return operation in which the horizontal drive part is configured to return the roller having been horizontally moved to the state at the time of the vertical drive part lowering operation, and a vertical drive part lifting operation in which the vertical drive part is configured to lift and return the roller. In various example embodiments, each of the jig sensor detection operation, the vertical drive part lowering operation, the horizontal rolling operation, and the horizontal drive part return operation may include an operation of standing by after each of the operations is performed, and a duration time period of the standby operation after the horizontal rolling operation may be longer than the duration time periods of the standby operations of the remaining operations.

Various example embodiments disclosed herein may provide a film attachment device wherein a roller pressurizes a film downwards on a surface of a housing plate, thereby improving the degree of attachment of the film to the housing plate on a curved portion of an edge portion.

BRIEF DESCRIPTION OF THE DRAWINGS

In connection with the description of the drawings, same or similar reference numerals will be used to refer to same or similar elements. Additionally, the above and other aspects, features and advantages of certain embodiments of the present disclosure will be more apparent from the following detailed description, taken in conjunction with the accompanying drawings, in which.

DETAILED DESCRIPTION

Figure 1A:
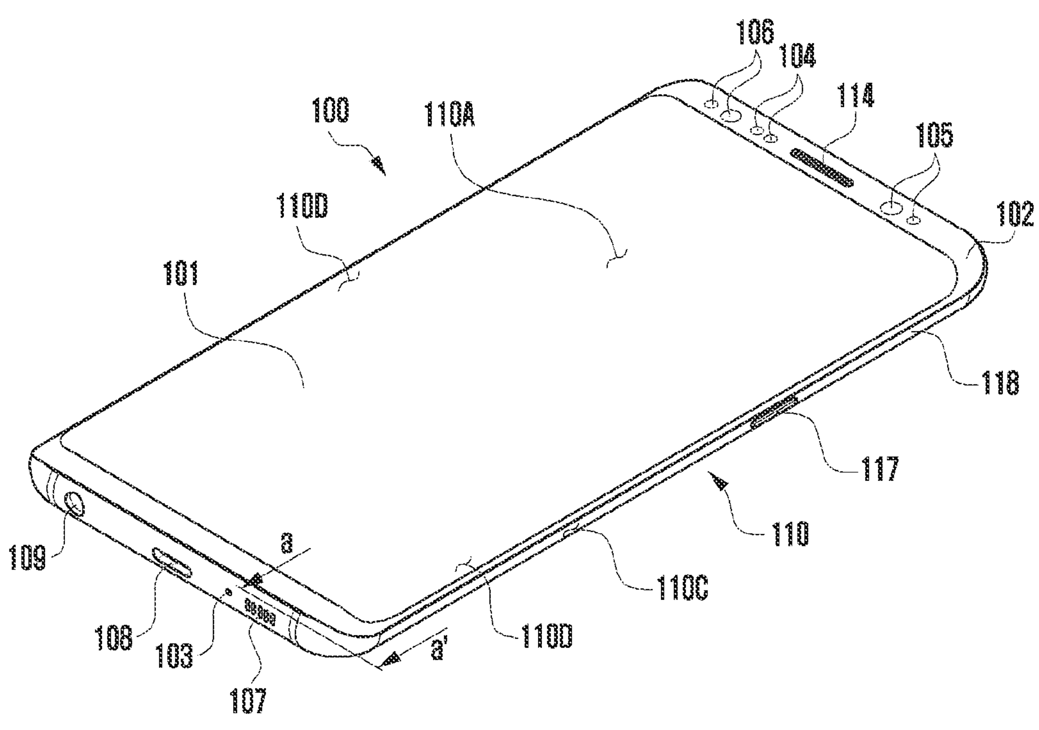
FIG. 1A is a front perspective view of an electronic apparatus according to various embodiments.

FIG. 1A is a front perspective view of an electronic apparatus according to various embodiments.

Figure 1B:
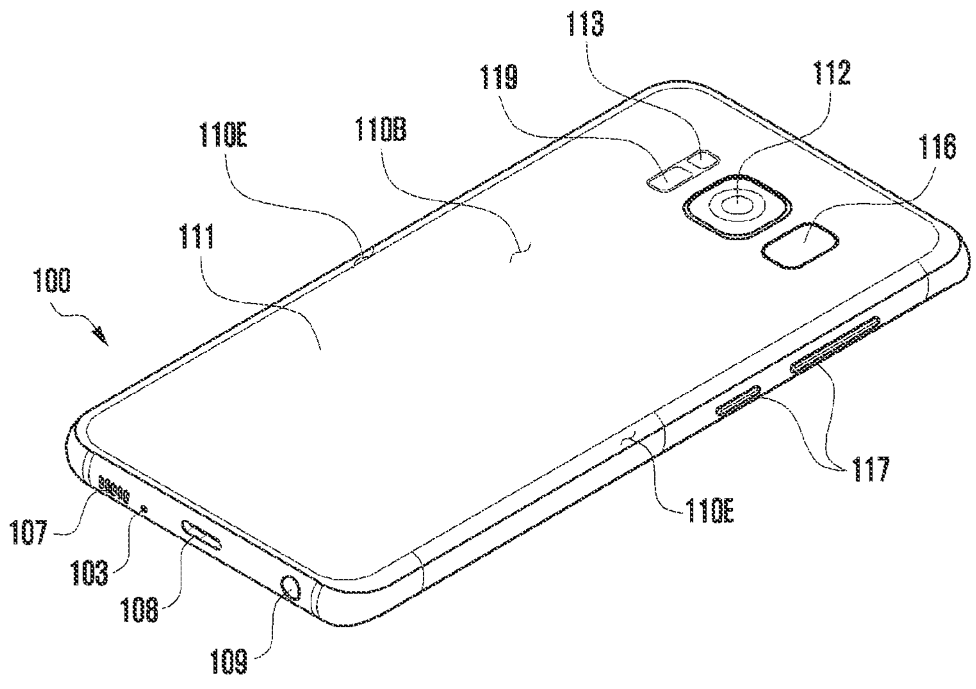
FIG. 1B is a rear perspective view of an electronic apparatus according to various embodiments.

FIG. 1B is a rear perspective view of an electronic apparatus according to various embodiments.

Referring to FIG. 1A and FIG. 1B, an electronic apparatus 100 according to an embodiment may include a housing 110 including a first surface (or a front surface) 110A, a second surface (or a rear surface) 110B, and a side surface 110C surrounding a space between the first surface 110A and the second surface 110B. In an embodiment (not shown), a housing may also be referred to as a structure which forms a part of the first surface 110A, the second surface 110B, and the side surface 110C in FIG. 1A. According to an embodiment, the first surface 110A may be formed by a front housing plate 102 (e.g., a polymer plate or a glass plate including various coating layers) of which at least a portion is substantially transparent. The second surface 110B may be formed by a substantially opaque rear a housing plate 111. For example, the rear housing plate 111 may be formed by coated or colored glass, ceramic, polymer, metal (e.g., aluminum, stainless steel (STS), or magnesium), or a combination of at least two of the above materials. The side surface 110C may be coupled to the front housing plate 102 and the rear housing plate 111, and/or may be formed by a lateral bezel structure (or a "lateral member") 118 including metal and/or polymer. In various embodiments, the rear housing plate 111 and the lateral bezel structure 118 may be integrally formed, and may include an identical material (e.g., a metal material such as aluminum).

In the illustrated embodiment, the front housing plate 102 may include two first areas 110D which are provided at opposite ends of the long edge of the front housing plate 102 and are bent from the first surface 110A toward the rear housing plate 111 to seamlessly extend, so as to form a curved surface. In the illustrated embodiment (see FIG. 1B), the rear housing plate 111 may include two second areas 110E which are provided at opposite ends of the long edge thereof and are bent from the second surface 110B toward the front plate 102 to seamlessly extend, so as to form a curved surface. In various embodiments, the front housing plate 102 (or the rear housing plate 111) may include only one of the first areas 110D (or the second areas 110E). In an embodiment, a part of the first areas 110D or the second areas 110E may not be included therein. In the embodiments, when viewed from the side surface of the electronic apparatus 100, the lateral bezel structure 118 may have a first thickness (or width) at the side of the side surface not including the first areas 110D or the second areas 110E, and may have a second thickness thinner than the first thickness at the side of the side surface including the first areas 110D or the second areas 110E.

According to an embodiment, the electronic apparatus 100 may include at least one of a display 101, audio modules 103, 107, and 114, sensor modules 104, 116, and 119, camera modules 105, 112, and 113, a key input device 117, a light-emitting element 106, and connector holes 108 and 109. In various embodiments, at least one (e.g., the key input device 117 or the light-emitting element 106) of the elements may be omitted from the electronic apparatus 100, or other elements may be additionally included therein.

For example, the display 101 may be visible through a substantial portion of the front housing plate 102. In various embodiments, at least a part of the display 101 may be visible through the front housing plate 102 forming the first surface 110A and the first areas 110D of the side surface 110C. In various embodiments, the corners of the display 101 may be formed to have a shape substantially the same as the shape of the corners of the front housing plate 102, which are adjacent thereto. In an embodiment (not shown), in order to expand an area allowing the display 101 to be visible, the gap between the outer perimeter of the display 101 and the outer perimeter of the front housing plate 102 may be formed to be substantially the same.

In an embodiment (not shown), a recess or an opening may be formed in a part of a screen display area of the display 101, and at least one of the audio module 114, the sensor module 104, the camera module 105, and the light-emitting element 106, which are aligned with the recess or the opening, may be included therein. In an embodiment (not shown), at least one of the audio module 114, the sensor module 104, the camera module 105, a fingerprint sensor 116, and the light-emitting element 106 may be included on the rear surface of the screen display area of the display 101. In an embodiment (not shown), the display 101 may be coupled to or disposed adjacent to a touch detection circuit, a pressure sensor capable of measuring the intensity (pressure) of touch, and/or a digitizer for detecting a magnetic field-type stylus pen. In various embodiments, at least a part of the sensor modules 104 and 119 and/or at least a part of the key input device 117 may be disposed in the first areas 110D and/or the second areas 110E.

The audio modules 103, 107, and 114 may include a microphone hole 103 and speaker holes 107 and 114. The microphone hole 103 may have a microphone disposed therein, which obtains external sound, and in various embodiments, multiple microphones may be arranged to be able to detect the direction of sound. The speaker holes 107 and 114 may include an external speaker hole 107 and a receiver hole 114 for phone calls. In various embodiments, the speaker holes 107 and 114 and the microphone hole 103 may be implemented as one hole, or a speaker (e.g., a piezo speaker) may be included therein without the speaker holes 107 and 114.

The sensor modules 104, 116, and 119 may generate an electrical signal or a data value corresponding to an internal operation state of the electronic apparatus 100 or an external environmental state. For example, the sensor modules 104, 116, and 119 may include a first sensor module 104 (e.g., a proximity sensor) and/or a second sensor module (not shown) (e.g., a fingerprint sensor) disposed on the first surface 110A of the housing 110, and/or a third sensor module 119 (e.g., an HRM sensor) and/or a fourth sensor module 116 (e.g., a fingerprint sensor) disposed on the second surface 110B of the housing 110. The fingerprint sensor may be disposed on not only the first surface 110A (e.g., the display 101) of the housing 110 but also the second surface 110B. The electronic apparatus 100 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic apparatus 100, and a second camera device 112 and/or s flash 113 disposed on the second surface 110B. The camera devices 105 and 112 each may include one lens or multiple lenses, an image sensor, and/or an image signal processor. For example, the flash 113 may include a light-emitting diode or a xenon lamp. In various embodiments two or more lenses (an infrared camera, a wide-angle lens, and a telephoto lens) and image sensors may be arranged on one surface of the electronic apparatus 100.

The key input device 117 may be disposed on the side surface 110C of the housing 110. In an embodiment, the electronic apparatus 100 may not include a part or the whole of the key input device 117 mentioned above, and the key input device 117 not included therein may be implemented as a different type such as a soft key, on the display 101. In various embodiments, the key input device may include the sensor module 116 disposed on the second surface 110B of the housing 110.

For example, the light-emitting element 106 may be disposed on the first surface 110A of the housing 110. For example, the light-emitting 106 may provide state information of the electronic apparatus 100 in the form of light. In an embodiment, for example, the light-emitting element 106 may provide a light source operating in association with an operation of the camera module 105. For example, the light-emitting element 106 may include an LED, an IR LED, and a xenon lamp.

The connector holes 108 and 109 may include a first connector hole 108 capable of accommodating a connector (for example, a USB connector) for transmitting or receiving power and/or data to or from an external electronic apparatus, and/or a second connector hole 109 (for example, an earphone jack) capable of accommodating a connector for transmitting or receiving an audio signal to or from an external electronic apparatus.

Figure 2:
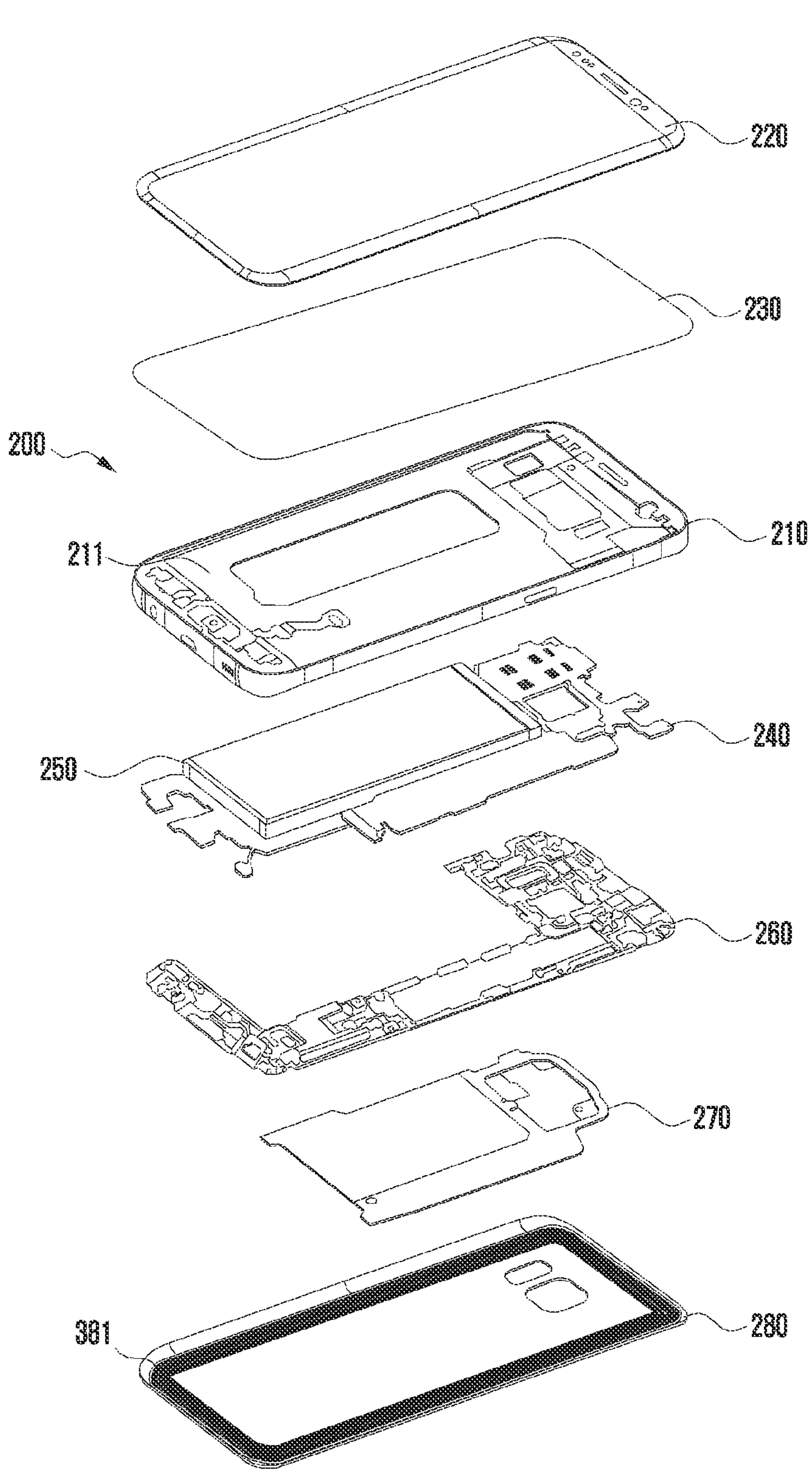
FIG. 2 is an exploded perspective view of an electronic apparatus according to various embodiments.

FIG. 2 is an exploded perspective view of an electronic apparatus according to various embodiments.

Referring to FIG. 2, an electronic apparatus 200 (for example, the electronic apparatus 100 in FIG. 1) may include a lateral bezel structure 210 (e.g., a housing), a first support member 211 (e.g., a bracket), a front housing plate 220, a display 230, a printed circuit board 240, a battery 250, a second support member 260 (e.g., a rear case), an antenna 270, and a rear housing plate 280. In various embodiments, at least one (e.g., the first support member 211 or the second support member 260) of elements may be omitted from the electronic apparatus 200, or other elements may be additionally included therein. At least one of elements of the electronic apparatus 200 may be the same as or similar to at least one of the elements of the electronic apparatus 100 in FIG. 1A or FIG. 1B, and overlapping descriptions thereof will be omitted hereinafter.

The first support member 211 may be disposed inside the electronic apparatus 200 to be connected to the lateral bezel structure 210 (e.g., a housing) or to be integrally formed with the lateral bezel structure 210. For example, the first support member 211 may be formed of a metal material and/or a non-metal (e.g., polymer) material. The display 230 may have one surface to which the first support member 211 is coupled, and the other surface to which the printed circuit board 240 is coupled. The printed circuit board 240 may have a processor, a memory, and/or an interface, which are mounted thereon. For example, the processor may include one or more of a central processing device, an application processor, a graphic processing device, an image signal processor, a sensor hub processor, and a communication processor.

For example, the memory may include a volatile memory or a non-volatile memory.

For example, the interface may include a high-definition multimedia interface (HDMI), a universal serial bus (USB) interface, an SD card interface, and/or an audio interface. For example, the interface may electrically or physically connect the electronic apparatus 200 to an external electronic apparatus, and may include a USB connector, an SD card/MMC connector, or an audio connector.

The battery 250 may be a device for supplying power to at least one element of the electronic apparatus 200, and for example, may include a non-rechargeable primary cell, a rechargeable secondary cell, or a fuel cell. For example, at least a part of the battery 250 may be disposed on substantially the same plane as the printed circuit board 240. The battery 250 may also be integrally disposed inside the electronic apparatus 200, or may also be disposed to be detachable/attachable from/to the electronic apparatus 200.

The antenna 270 may be disposed between the rear housing plate 280 and the battery 250. For example, the antenna 270 may include a near field communication (NFC) antenna, a wireless charging antenna, and/or a magnetic secure transmission (MST) antenna. For example, the antenna 270 may perform a short-range communication with an external device, or may wirelessly transmit or receive power required for charging. In an embodiment, an antenna structure may be formed by a part or a combination of the lateral bezel structure 210 and/or the first support member 211.

In various embodiments, a film 381 may be attached on the surface of the front housing plate 220 and/or rear housing plate 280 coupled to the lateral bezel structure 210. In various embodiments, the film 381 may include a single material having a thin film shape, and in an embodiment, the film 381 may have a multi-layer structure in which multiple composite materials including different materials and/or multiple materials different from each other are laminated and for example, may include a multi-layer structure including at least one polymer, metal, and/or ceramic thin film layer which is deposited. In various embodiments, the film 381 may be a sealing tape which seals the gap between the front housing plate 220 and/or the rear housing plate 280 and the lateral bezel structure 210 to impart waterproofness to the electronic apparatus 200. In an embodiment, the film 381 may include a coupling member configured to couple the front housing plate 220 and/or the rear housing plate 280 and the lateral bezel structure 210, and for example, may a double-sided adhesive tape and the like. In an embodiment, the film may be an insulation member for preventing/reducing a short circuit in which the front and/or the rear housing plate 220 and/or 280 of the electronic apparatus and the printed circuit board 240 are electrically connected.

Figure 3A:
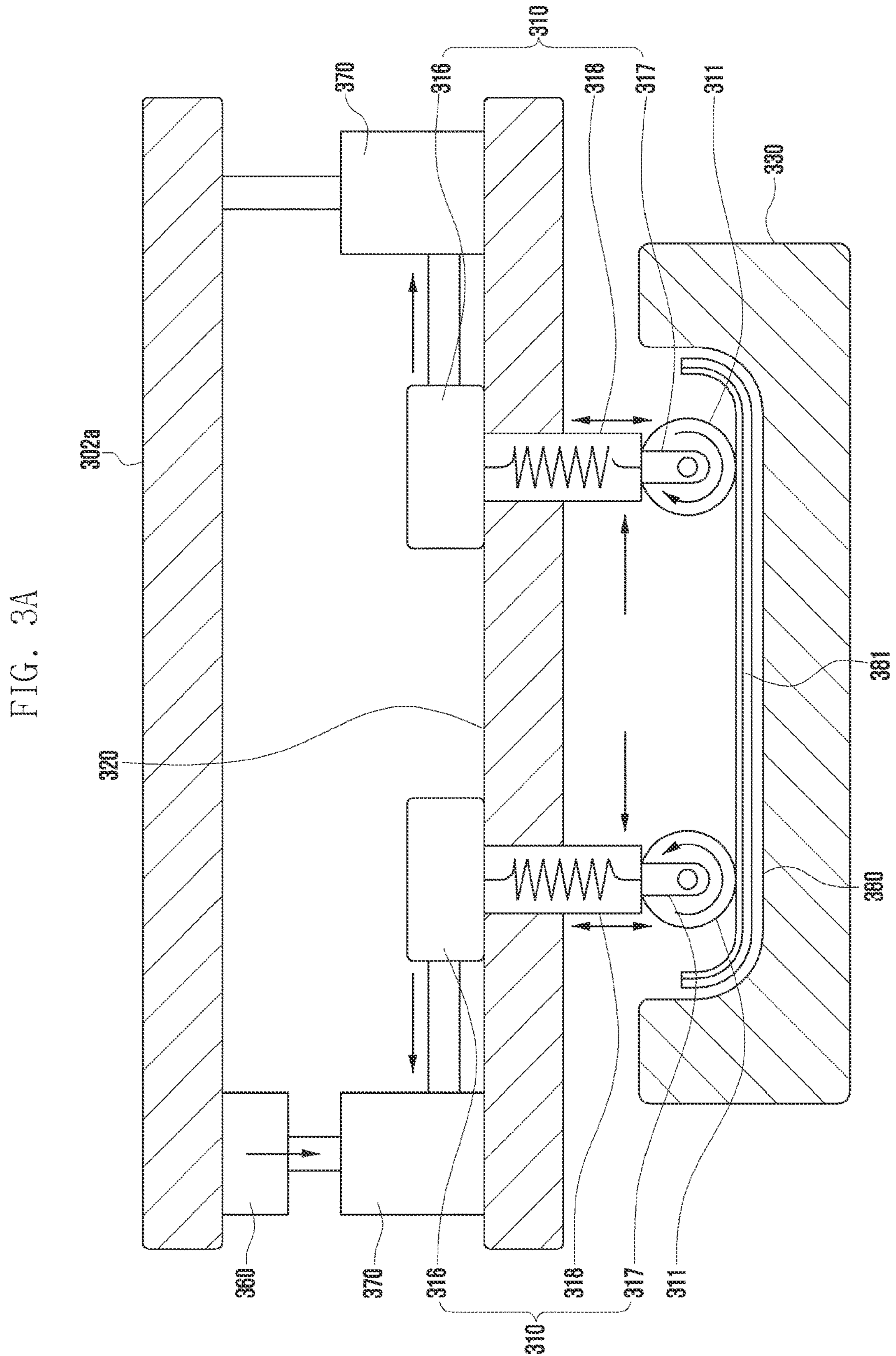
FIG. 3A is a cross-sectional side view of a film attachment apparatus according to various embodiments.

FIG. 3A is a diagram illustrating a side view of a film attachment apparatus 300 according to various embodiments.

Figure 3B:
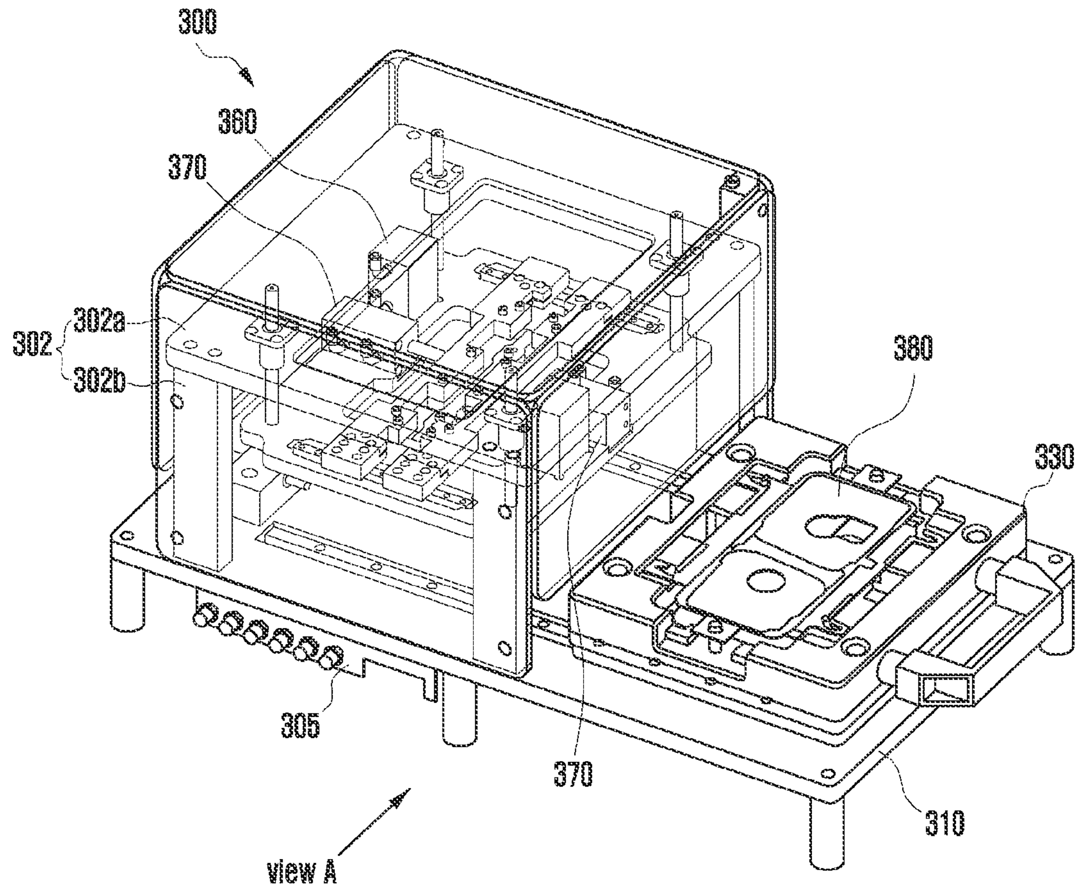
FIG. 3B is a perspective view of a film attachment apparatus according to various embodiments.

FIG. 3B is a perspective view of a film attachment apparatus 300 according to various embodiments.

Figure 3C:
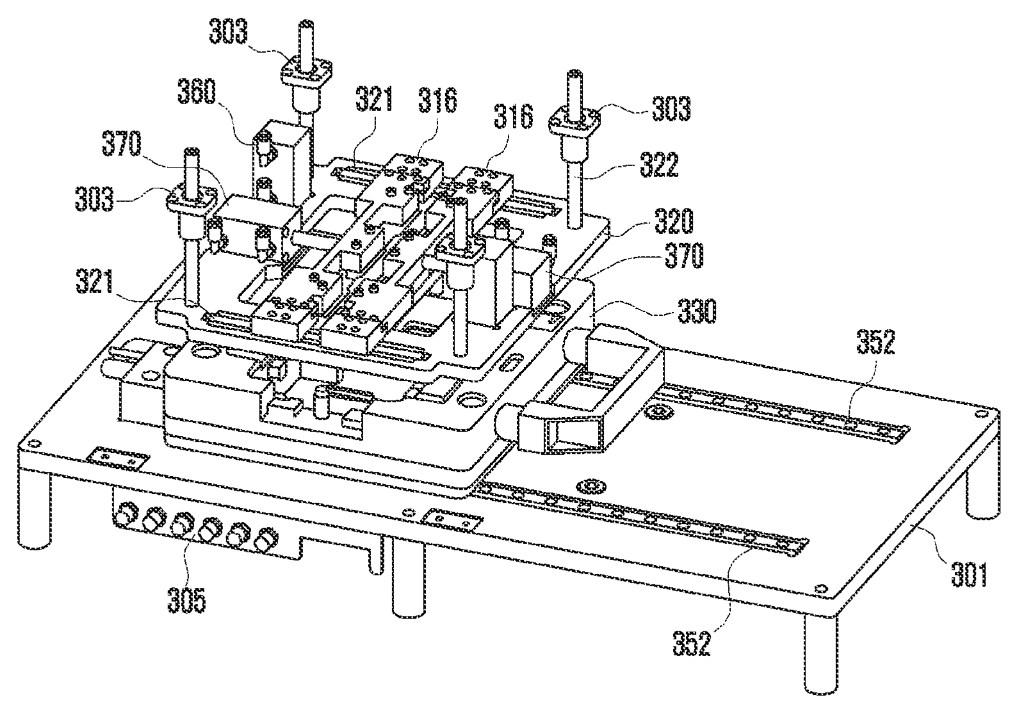
FIG. 3C is an internal perspective view of a film attachment apparatus according to various embodiments.

FIG. 3C is an internal perspective view of a film attachment apparatus 300 according to various embodiments.

FIG. 3A is a diagram illustrating the side surface of a film attachment apparatus 300 when viewed in direction A in FIG. 3B.

FIG. 3C is an internal perspective view showing a state in which outer plates 304 and a main frame 302 are removed, in order to show the inside of a film attachment apparatus 300.

Referring to FIG. 3A, FIG. 3B and FIG. 3C, a film attachment apparatus 300 may include a foundation 301, a main frame 302, a jig 330, rollers 311, a vertical drive part 360, and a horizontal drive part 370.

The foundation 301 may be a plate-shaped member for providing a fixed base which allows elements of the film attachment apparatus 300 described below to be positioned thereon. In various embodiments, the foundation 301 may include a jig rail 352 for guiding a movement of the jig 330 to be described later. The action of the jig rail 352 will be described later. The main frame 302 may be a member which is fixed and coupled to the foundation 301, and supports elements such as a roller carriage 310, a lifting/lowering plate 320, and a vertical drive part 360 to be described later. The main frame may include an upper plate 302*a* and a main frame column 302*b* for supporting the upper plate 302*a*. In various embodiments, the exterior of main frame 302 may be covered by the multiple outer plates 304. The outer plates 304 may prevent/reduce a foreign matter such as dust from being introduced thereinto when the film 381 is attached.

The roller 311 may be a member which downwardly presses a film 381 (for example, the film 381 in FIG. 2) to a housing plate 380 (for example, the front housing plate 220 and/or the rear housing plate 280) of an electronic apparatus (for example, the electronic apparatus 200 in FIG. 2), moves along the surface of the housing plate 380 while rotating, and thus reaches the edge part of the housing plate 380, which has a-curved surface, thereby attaching the film 381 onto the housing plate 380. In various embodiments, the roller 311 may be moved in a horizontal direction and a vertical direction (in the disclosure, the terms “horizontal” and “vertical” may be based on the direction of the surface of the housing plate 380, to which the film 381 is attached, and hereinafter, the same below) by the horizontal drive part 370 and the vertical drive part 360 to be described later. In various embodiments, the film attachment apparatus 300 may include multiple rollers 311. The multiple rollers 311 may be arranged parallel to each other, and on the surface of the housing plate 380, may move toward multiple edge parts of the housing plate 380, which face each other, to be able to uniformly attach the film 381 thereonto.

In various embodiments, each of the rollers 311 may be coupled to elastic member 318. The elastic member 318 may be a member which presses the roller 311 against the surface of the housing plate 380 and allows the roller 311 to move upward or downward. In various embodiments, the rollers 311 may be coupled to the roller carriage 310, the roller carriage 310 may be coupled to the horizontal drive part 370, and thus the rollers 311 may be rotated while being moved in a horizontal direction by the horizontal drive part 370. A detailed configuration of the roller carriage 310 will be described later. In various embodiments, the film attachment apparatus 300 may include the lifting/lowering plate 320 coupled to the horizontal drive part 370 and the vertical drive part 360, the roller carriage 310 may be coupled to the lifting/lowering plate 320 to be slidable in the horizontal direction and thus be moved in the horizontal direction by the horizontal drive part 370, and the lifting/lowering plate 320 may be moved up or down by the vertical drive part 360 to move the roller 311 in the vertical direction and thus may press the roller 311 to the film 381 and against the housing plate 380. In various embodiments, the lifting/lowering plate 320 may include a carriage rail 321 for guiding a movement in the horizontal direction of the roller carriage 310, and the roller carriage 310 may be slidably coupled to the carriage rail 321.

The jig 330 may be a member which is positioned below the roller 311 and on which the housing plate 380 of the electronic apparatus is seated in order to attach the film 381. In various embodiments, the upper surface of the jig 330 may have a shape corresponding to a surface on which the housing plate 380 of the electronic apparatus is seated. In various embodiments, the jig 330 may be a member capable of being replaced in case that a model of an electronic apparatus, which is produced, is changed, in order to fit the model and the outer shape of an electronic apparatus subjected to a film attachment operation. A configuration associated with the replacement of the jig 330 will be described later.

The vertical drive part 360 may drive the roller 311 in a direction vertical to the surface of the housing plate 380 seated on the jig 330. In various embodiments, the vertical drive part 360 may have one end coupled to the main frame 302 and the other end coupled to the lifting/lowering plate 320, and thus may move the roller carriage 310 coupled to the lifting/lowering plate 320 and a roller 311 coupled to the roller carriage 310 up or down.

The horizontal drive part 370 may drive the roller 311 in the horizontal direction on the surface of the housing plate 380 seated on the jig 330, and may move the roller 311 from a central part 314 to the edge part of the surface of the housing plate 380. In various embodiments, the horizontal drive part 370 may have one end coupled to the lifting/lowering plate 320 and the other end coupled to the roller carriage 310, and thus may move the roller carriage 310 slidably coupled to the lifting/lowering plate 320 and the roller 311 coupled to the roller carriage 310 in the horizontal direction. In various embodiments, the film attachment apparatus 300 may include the multiple rollers 311 arranged in parallel, and the horizontal drive part 370 may move the multiple rollers 311 to edge parts of the housing plate 380, which face each other, in the horizontal direction. In various embodiments, the film attachment apparatus 300 may include multiple horizontal drive parts 370 which drive the multiple rollers 311, respectively.

The vertical drive part 360 and the horizontal drive part 370 may use various power sources including electricity, hydraulic pressure, pneumatic pressure, or a combination thereof. For example, the vertical drive part 360 and the horizontal drive part 370 may include a linear motor or a motor coupled to a rack and a pinion gear. In an embodiment, the vertical drive part 360 and the horizontal drive part 370 may include a hydraulic piston and/or a pneumatic piston. The main frame 302 may include a valve stand 305 for adjusting the supply of hydraulic oil and/or compressed air to the vertical drive part 360 and the horizontal drive part 370.

Figure 4A:
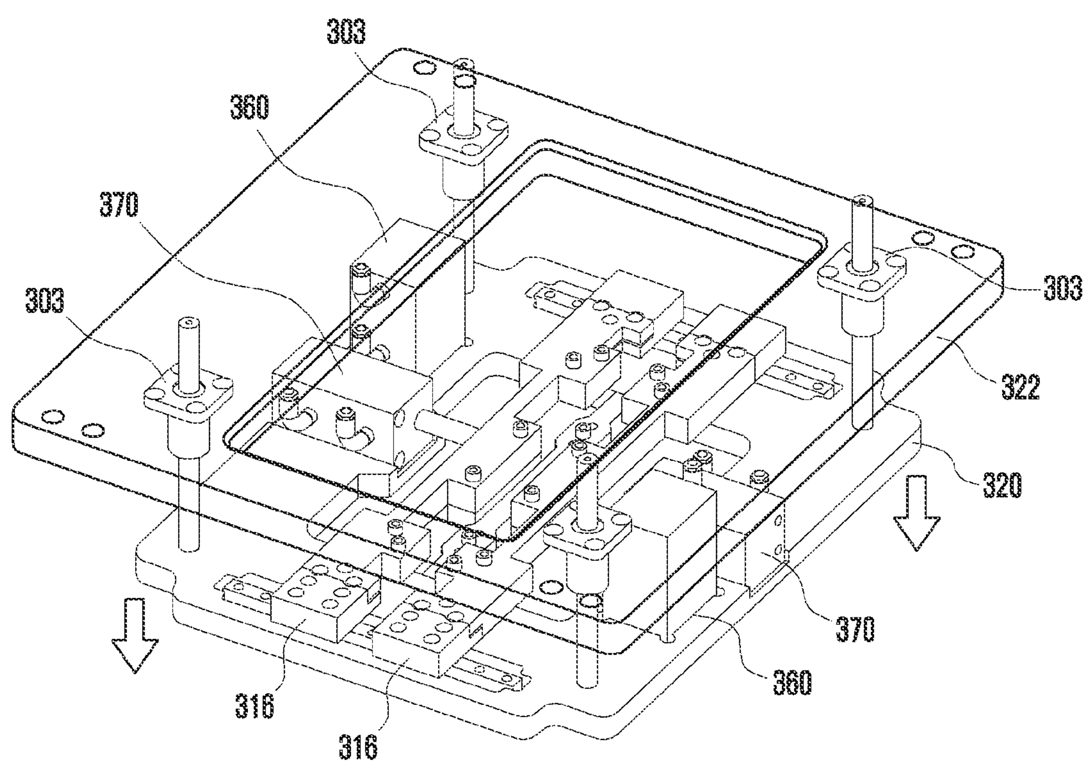
FIG. 4A and FIG. 4B are internal perspective views illustrating an example operation of a vertical drive part according to various embodiments.
Figure 4B:
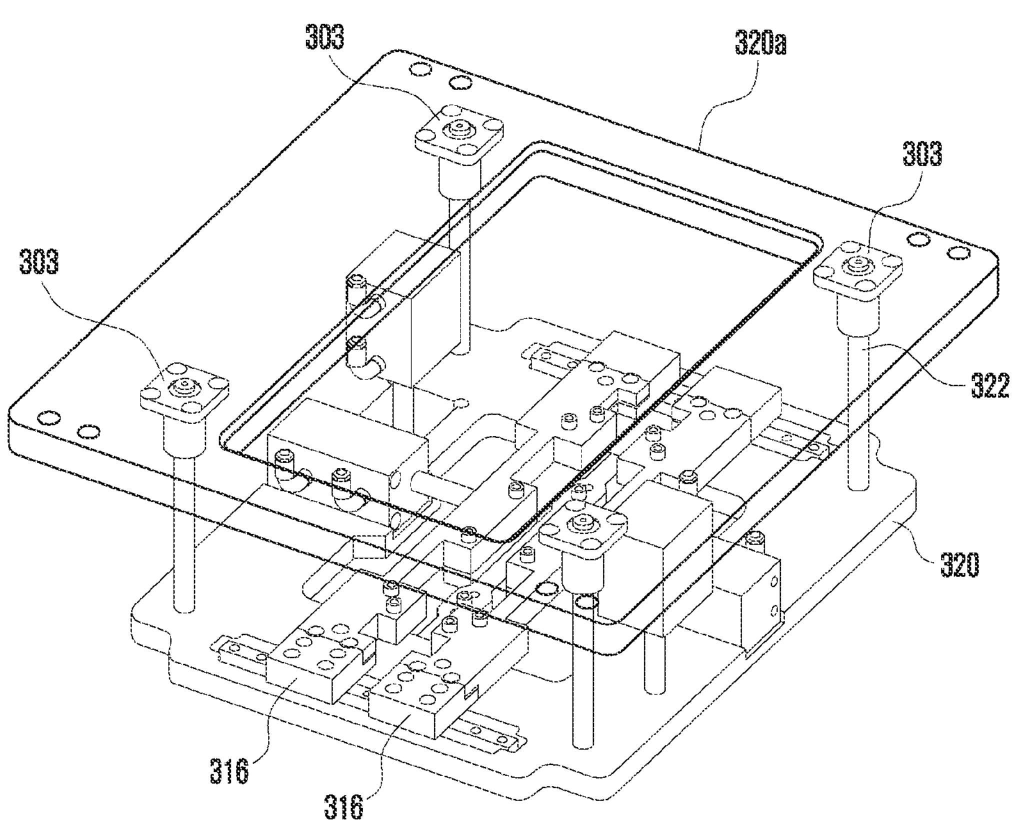

FIG. 4A and FIG. 4B are internal perspective views illustrating an example operation of a vertical drive part 360 according to various embodiments.

In FIG. 4A and FIG. 4B a part of the outer plates 304 and the main frame 302 are omitted for clarity.

Referring to FIG. 4A and FIG. 4B, in various embodiments, the lifting/lowering plate 320 may include guide poles 322 extending through an upper plate 302*a* of the main frame 302, and the upper plate 302*a* may include lifting/lowering guides 303 through which the guide poles 322 slidably extend. The roller carriage 310 may be slidably coupled to the carriage rail 321 of the lifting/lowering plate 320. The lifting/lowering plate 320 may be pressed downward to the upper plate 302*a* of the main frame 302 as the vertical drive part 360 operates, and thus the roller carriage 310 of the lifting/lowering plate 320 may move downward. In case that the roller carriage 310 moves upward, operations opposite to the above-described operation may be performed.

Figure 5A:
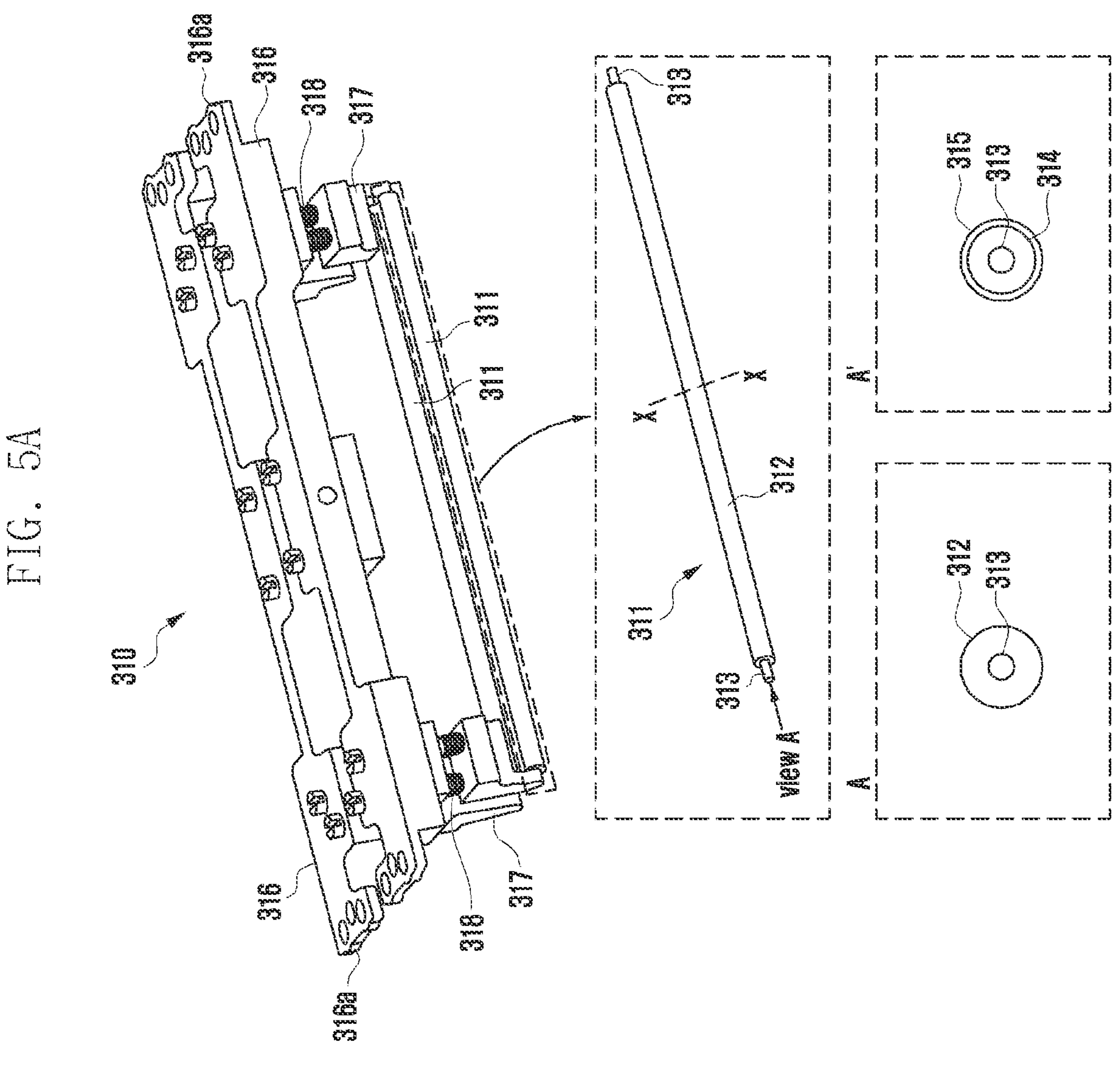
FIG. 5A is a perspective view showing a roller carriage of a film attachment apparatus according to various embodiments.

FIG. 5A is a perspective view illustrating an example roller carriage 310 of a film attachment apparatus 300 according to various embodiments.

Figure 5B:
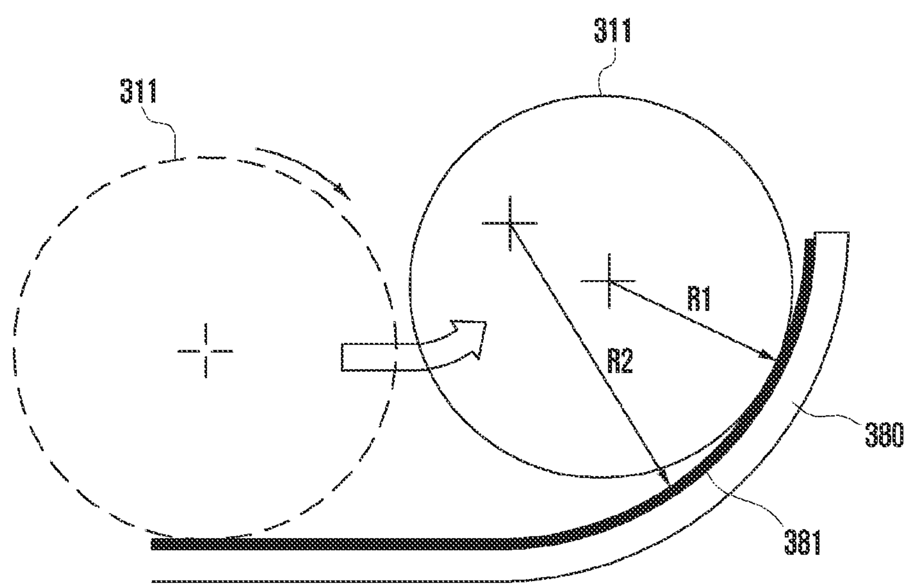
FIG. 5B is a cross-sectional view showing a roller according to various embodiments.

FIG. 5B is a cross-sectional view illustrating an example roller 311 according to various embodiments.

Figure 5C:
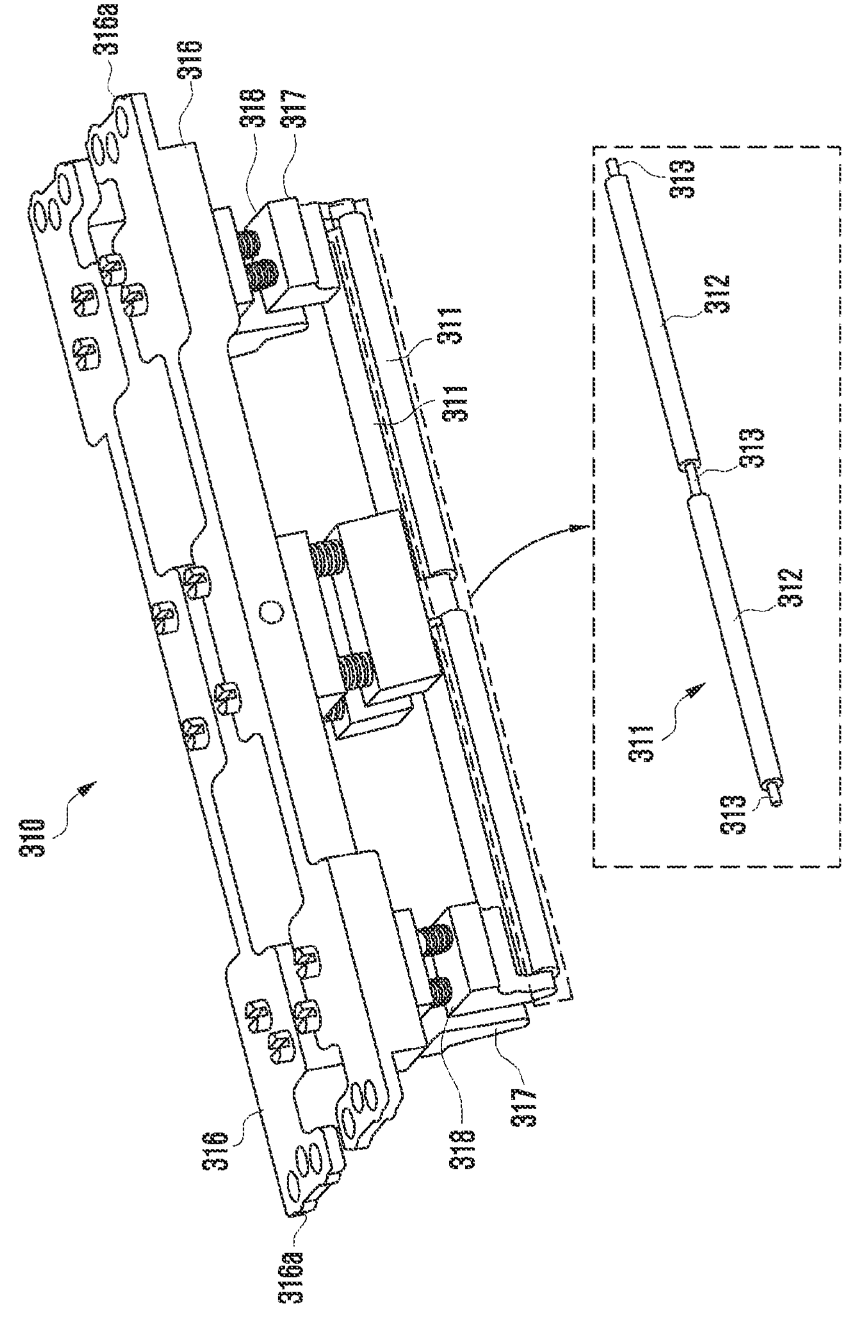
FIG. 5C is a perspective view showing a roller carriage of a film attachment apparatus according to various embodiments.

FIG. 5C is a perspective view illustrating an example roller carriage 310 of a film attachment apparatus 300 according to various embodiments.

The cross section in FIG. 5B is a cross section cut along the direction X-X in FIG. 5A.

Referring to FIG. 5A, the roller carriage 310 may include the roller 311, a roller beam 316, the elastic member 318, and a bearing case 317.

The roller 311 may be a member which rotates and moves to the edge part thereof while pressing downward the film 381 from above the housing plate 380, thereby attaching the film 381 onto the surface of the housing plate 380. In various embodiments, the roller 311 may include a cylindrical roll body 312 which downwardly presses the film 381 to the housing plate 380, and journal parts which are formed at opposite terminal ends of the roll body 312 and have a cylindrical shape having a diameter smaller than the roll body 312. The journal parts 313 may receive a pressing force applied by the roller carriage 310 in order to downwardly press the roller 311, and the journal parts 313 may be portions which transmit, to the roller carriage 310, a reaction force applied to the roller 311 by the film 381 in case that the roller 311 presses the film 381 downward.

Referring to A' in FIG. 5A, in various embodiments, the roll body 312 may include a core part 314 which includes a high-strength material such as metal (for example, stainless), is positioned at the central part 314 of the roller 311, and enables the rigidity of the roller 311 to be maintained, and an elastic polymer material 315 (for example, polymer such as silicon, butadiene rubber, or TPU) which surrounds the outer circumferential surface of the core part 314. In case that the surface of the roll body 312 of the roller 311 is made of a high-strength material such as metal, due to tolerance in alignment of the roll body 312 or unevenness of the surface thereof, the roller 311 may not be sufficiently in contact with the film 381 so that lifting of the film 381 or bubbles occur. Therefore, in case that the surface of the roll body 312 includes an elastic polymer material 315, when the roller 311 presses the film 381 downward, due to the elastic deformation of the elastic polymer material 315, a close contact degree between the roller 311 and the film 381 may be increased, and thus the occurrence of lifting of the film 381 or bubbles can be reduced.

Referring to FIG. 5B, in the edge part of the housing plate 380, the roller 311 may press and thus attach the film 381 to the housing plate 380 while ascending along the curved surface of the edge part of the housing plate 380. A radius R1 (may refer, for example, to the radius of the roll body 312 of the roller 311, and hereinafter, the same) of the roller 311 may be smaller than or equal to a curvature radius R2 of the curved surface formed on the edge part of the housing plate 380. In case that the radius of the roller 311 is greater than the curvature radius of the edge part, the roll body 312 may not fully press the film 381. In an embodiment, the radius of the roller 311 may be set in consideration of various factors such as the curvature radius of the edge part of the housing plate 380, the thickness of the film 381, and an error in processing by the roller 311. For example, the roller 311 may have a radius smaller than the curvature radius of the housing plate 380 by 0.5 mm. In various embodiments, the apparatus 300 for attaching the film 381 may be configured such that the rollers 311 having different radii can be replaced according to the change of the curvature radius of the edge part of the housing plate 380, in case that a model of an electronic apparatus, which is produced, is changed.

Referring again to FIG. 5A, the roller 311 may be assembled to the roller carriage 310 including the roller beam 316, the elastic member 318, and the bearing case 317. The roller carriage 310 may be detachably fastened to the lifting/lowering plate 320, and thus be rapidly replaced in case that the radius of the roller 311 needs to be changed.

The roller beam 316 may be a member coupled to one end of the elastic member 318 so as to support the elastic member 318, the bearing case 317, and the roller 311, detachably fastened to the lifting/lowering plate 320, and slidably coupled to the carriage rail 321 formed on the lifting/lowering plate 320. In various embodiments, the roller beam 316 may be a beam which withstands the downward pressing force of the roller 311 and resists the bending moment thereof. The roller beam 316 may be coupled to the lifting/lowering plate 320 using a fastening means which enables quick fastening, for example, a quick change lever, a snap fastener, or a screw. The roller beam 316 may include a coupling part 316*a* formed at each of opposite terminal ends thereof and slidably coupled to the carriage rail 321.

The elastic member 318 may be a member which has one end coupled to the roller beam 316 and the other end coupled to the bearing case 317 to be described later, and therefore presses the roller 311 downward and enables the roller 311 to move in the vertical direction. As described above, in case of attaching the film onto the edge part of the housing plate 380, the roller 311 should be lifted upward by the curved surface formed on the edge part, and the elastic member 318 may be elastically deformed and thus allow the roller 311 to move in the vertical direction. In various embodiments, for example, the elastic member 318 may include a linear elastic member 318 such as a coil spring or a volute spring.

The bearing case 317 may be a member which surrounds and grips the journal part 313 of the roller 311 and applies a downward pressing force to the roller 311 while supporting the rotational motion of the roller 311. In various embodiments, the bearing case 317 may include various rotating shaft support means such as a sleeve bearing, a fluid bearing, a ball bearing, or a roller bearing.

Referring to FIG. 5C, in various embodiments, the journal parts 313 of the roller 311 may be positioned at opposite terminal ends of the roll body 312 and the center of the roller 311, and the roll body 312 may be divided by the journal part 313 positioned at the center of the roller 311. The bearing cases 317 may be arranged at positions corresponding to the positions of the journal parts 313 of the roller 311. The journal part 313 may be positioned the center of the roller 311, the journal part 313 at the center of the roller 311 may be supported by the bearing case 317, and thus the roll body 312 of the roller 311 may have a reduced length to thus reduce the bending moment thereof. Therefore, in case that the roller 311 downwardly presses the film 381 and the housing plate 380, the bending of the roller 311 may be reduced. As the bending of the roller 311 is reduced, a close contact degree of the roller 311 with respect the film 381 and the housing plate 380 may be increased.

Figure 6A:
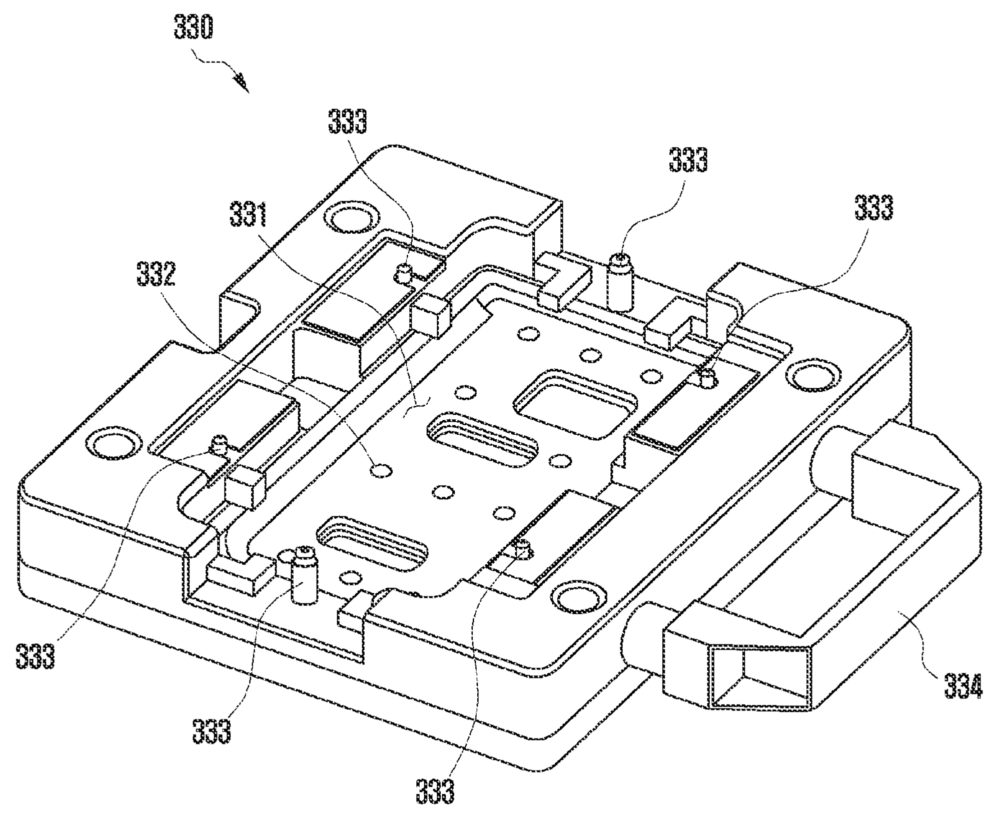
FIG. 6A is a perspective view showing a jig according to various embodiments.

FIG. 6A is a perspective view illustrating an example jig 330 of various embodiments.

Figure 6B:
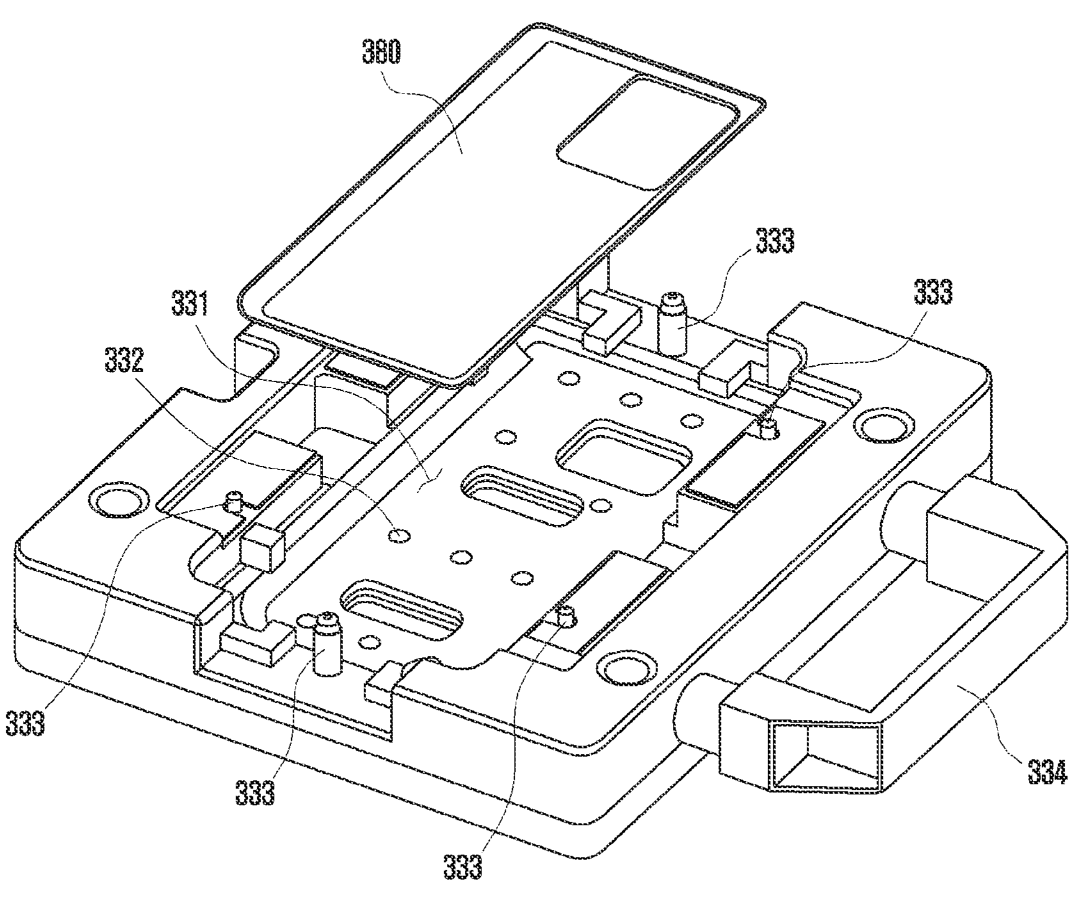
FIG. 6B and FIG. 6C are perspective views showing an operation in which a housing plate is seated on a jig according to various embodiments.
Figure 6C:
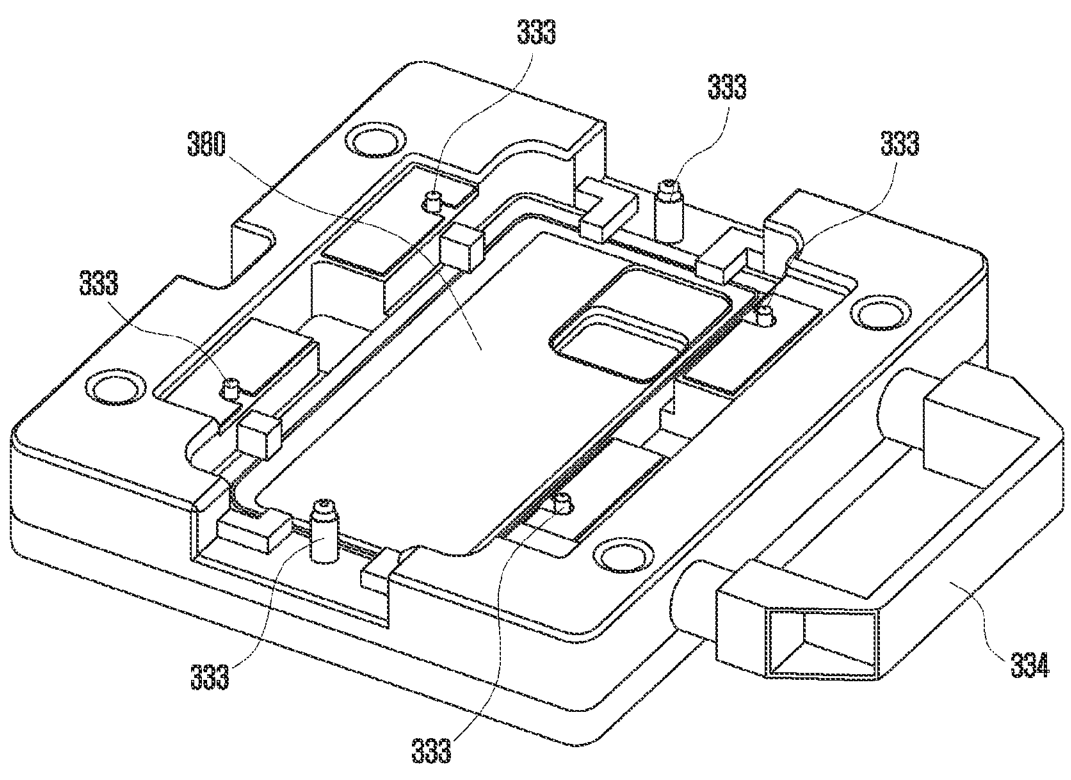

FIG. 6B and FIG. 6C are perspective views illustrating an example operation in which a housing plate 380 is seated on a jig 330 according to various embodiments.

Referring to FIG. 6A, the jig 330 may include a seat surface 331 and release sheet guides 333. The seat surface 331 may be a surface onto which the housing plate 380 is seated and fixed during film attachment work. Referring to FIG. 6B and FIG. 6C, the housing plate 380 may be moved from above the seat surface 331 of the jig 330 to the seat surface 331 of the jig 330.

The surface shape of the seat surface 331 may have a shape corresponding to the housing plate 380 to which the film 381 is attached. In various embodiments, the seat surface 331 may include a suction hole 332. The suction hole 332 may be a recessed part perforated on the seat surface 331 and connected to a vacuum pump (not shown). A vacuum may be formed in the suction hole 332 in a state where the housing plate 380 is seated on the seat surface 331, and thus the housing plate 380 may be stably fixed on the seat surface 331.

The release sheet guides 333 may be a member which fixes the position of a release sheet 340 positioned above the housing plate 380 fixed on the seat surface 331 and guides a movement of the release sheet 340 during the film attachment work. A detailed configuration of the release sheet 340 will be described in greater detail below. In various embodiments, each of the release sheet guides 333 may include a column-shaped member disposed on a perimeter part of the seat surface 331.

In various embodiments, the jig 330 may include a handle 334. The handle 334 may be a member capable of being gripped by the hand of an operator, in order for the operator to fasten the jig 330 to the jig base 350 to be described later and in order to insert or withdraw the jig 330 into or from the lower part of the roller carriage 310.

Figure 7:
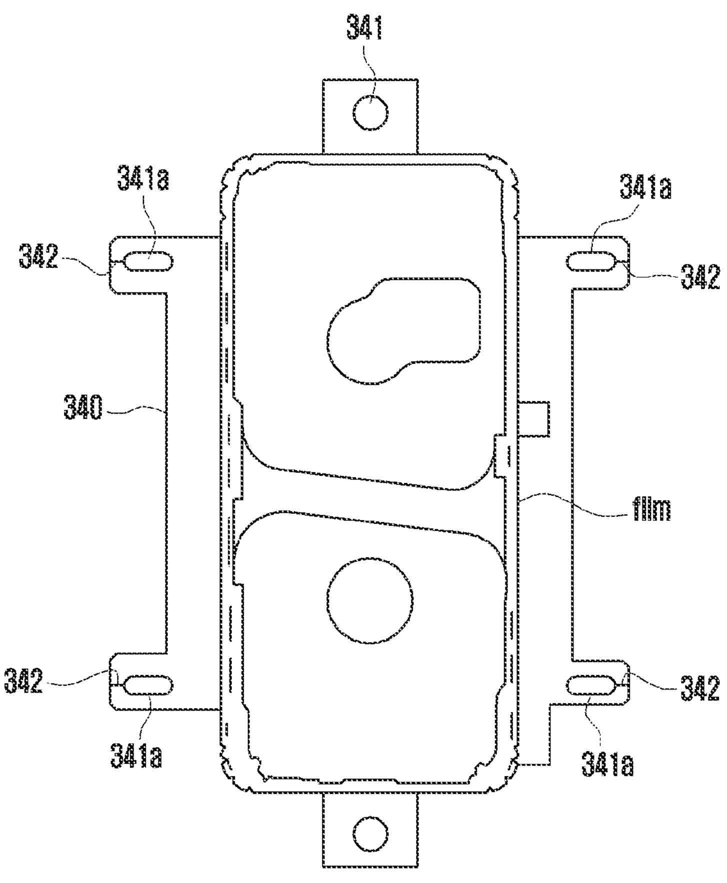
FIG. 7 is a diagram illustrating a plan view showing a release sheet according to various embodiments.

FIG. 7 is a diagram illustrating a plan view showing a release sheet 340 according to various embodiments.

Referring to FIG. 7, the release sheet 340 may be a member which has a flat-surface shape and to which the film 381 is detachably attached. In various embodiments, the release sheet 340 may include a polymer material such as polyethylene, polyvinyl chloride silicone, or oriented polypropylene (OP). In various embodiments, the release sheet 340 may have a low interfacial energy and thus may include a surface treated such that an adhesive ingredient on the surface of the film 381 is easily detached.

In various embodiments, the release sheet 340 may include guide holes 341 arranged in outer perimeter parts of the film 381. The guide holes 341 may allow the release sheet guides 333 of the jig 330 to extend therethrough and thus may fix the release sheet 340 and the film 381 attached to the release sheet 340 in case of attaching the film 381 thereonto. In various embodiments, the guide holes 341 adjacent to area corresponding to the edge parts (for example, 110D in FIG. 1 or 110E in FIG. 2) of the housing plate 380, on which the curved surface is formed, may include lengthened holes 341*a* extending in the direction in which the roller 311 moves when the film 381 is attached, and for example, may include lengthened holes 341*a* having an elliptical shape or a stadium shape.

In various embodiments, the release sheet 340 may include a perforated line 342 formed by cutting an edge of the lengthened hole 341*a* from the inside of the lengthened hole 341*a* to a direction outside of the release sheet 340. The action of the lengthened hole 341*a* and the perforated line 342 formed around the lengthened hole 341*a* will be described later.

Figure 8A:
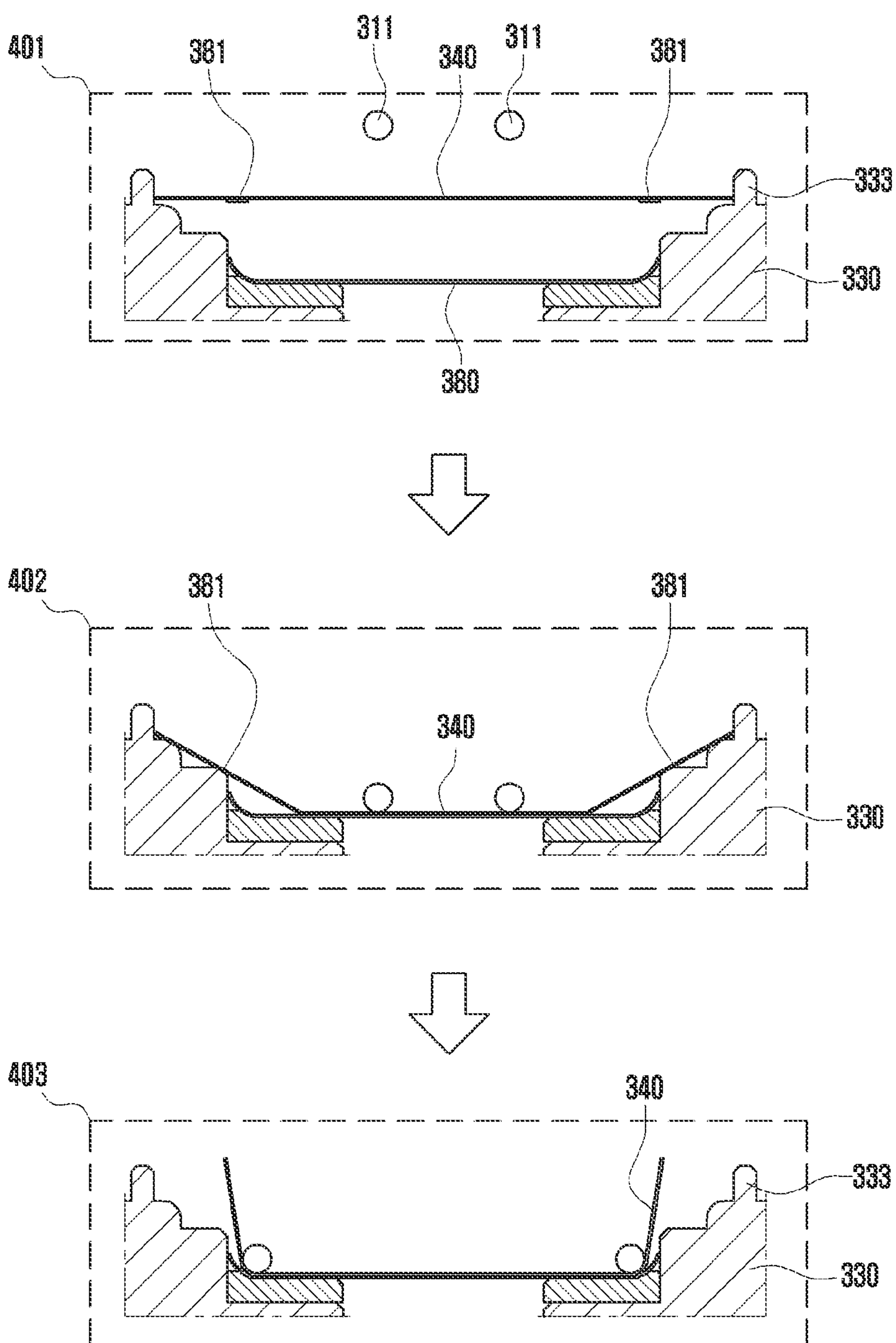
FIG. 8A is a diagram illustrating an example operation of a film attachment apparatus according to various embodiments.

FIG. 8A is a diagram illustrating an example operation of a film attachment apparatus 300 according to various embodiments.

Figure 8B:
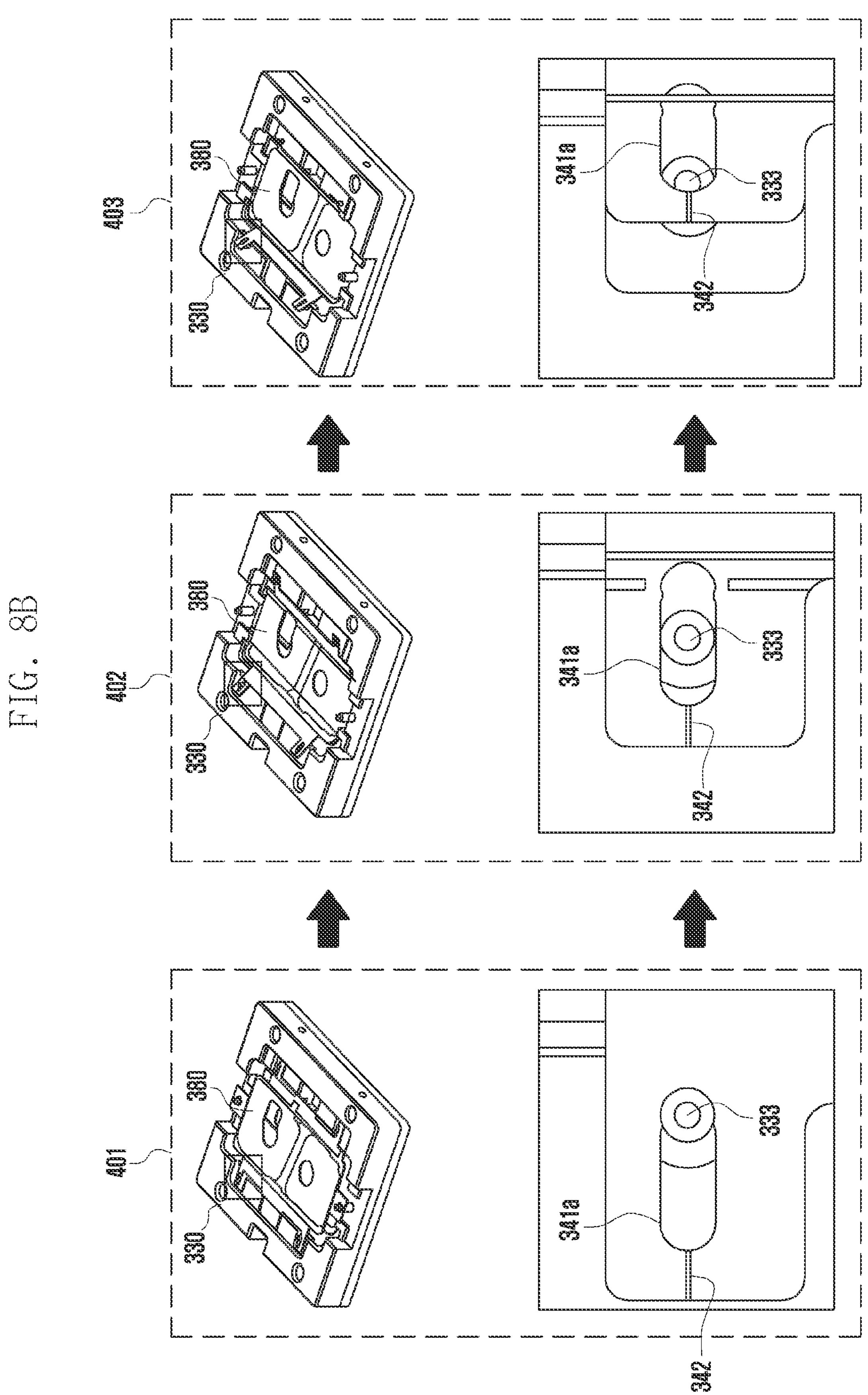
FIG. 8B is a perspective view and an enlarged plan view illustrating an example operation of a film attachment apparatus according to various embodiments.

FIG. 8B includes a perspective view and an enlarged plan view illustrating an example operation of a film attachment apparatus 300 according to various embodiments.

In FIG. 8A, some elements are omitted for clarity.

Referring to FIG. 8A and FIG. 8B, in a first operation 401 of a film attachment operation, the housing plate 380 may be seated on the seat surface 331 and the release sheet guides 333 of the jig 330 may extend through the guide holes 341 of the release sheet 340, so that the release sheet guides 333 are inserted in the guide holes 341 and thus the release sheet 340 is positioned above housing plate 380. Due to the curved-surface part of the edge part of the housing plate 380, the release sheet 340 may be positioned on housing plate 380 while having a predetermined distance. The film 381 may be attached to the lower surface of the release sheet 340. The roller 311 may be positioned above the release sheet 340 in a state of being lifted by the vertical drive part 360.

In a second operation 402 of the film attachment operation, the roller 311 may be lowered by the vertical drive part 360, and thus the roller 311 may press the release sheet 340 downward so that the release sheet 340 and the film 381 is lowered and pressed to the surface of the housing plate 380. Referring to the second operation in FIG. 8B, in case that the release sheet 340 and the film 381 are lowered to the housing plate 380, the release sheet 340 may be pulled based on the release sheet guides 333. Since the release sheet 340 includes the lengthened holes 341*a* and the release sheet 340 is pulled in the direction in which the lengthened holes 341*a* extend, the release sheet 340 may be lowered to the housing plate 380 while the state where the release sheet guides 333 extend through the lengthened holes 341*a* is maintained. If described based on the release sheet guide 333, the release sheet 340 may be pulled such that the release sheet guides 333 closely approach the outer terminal end parts of the lengthened holes 341*a*.

In a third operation 403 of the film attachment operation, the roller 311 may press and thus attach the release sheet 340 and the film 381 to the housing plate 380 while moving to the edge part of the housing plate 380. In case that roller 311 is positioned on the edge part of the housing plate 380, the release sheet 340 may be bent by the roller 311 and due to the curved-surface shape of the edge part, and thus the outer terminal end parts of the lengthened holes 341*a* may be pulled and thus be in contact with the release sheet guides 333. Referring to the third operation in FIG. 8B, since the perforated line 342 is formed at the edge of the outer terminal end part of the lengthened hole 341*a*, the release sheet guide 333 may pass through the perforated line 342 and thus may escape from the lengthened hole 341*a*.

Figure 9A:
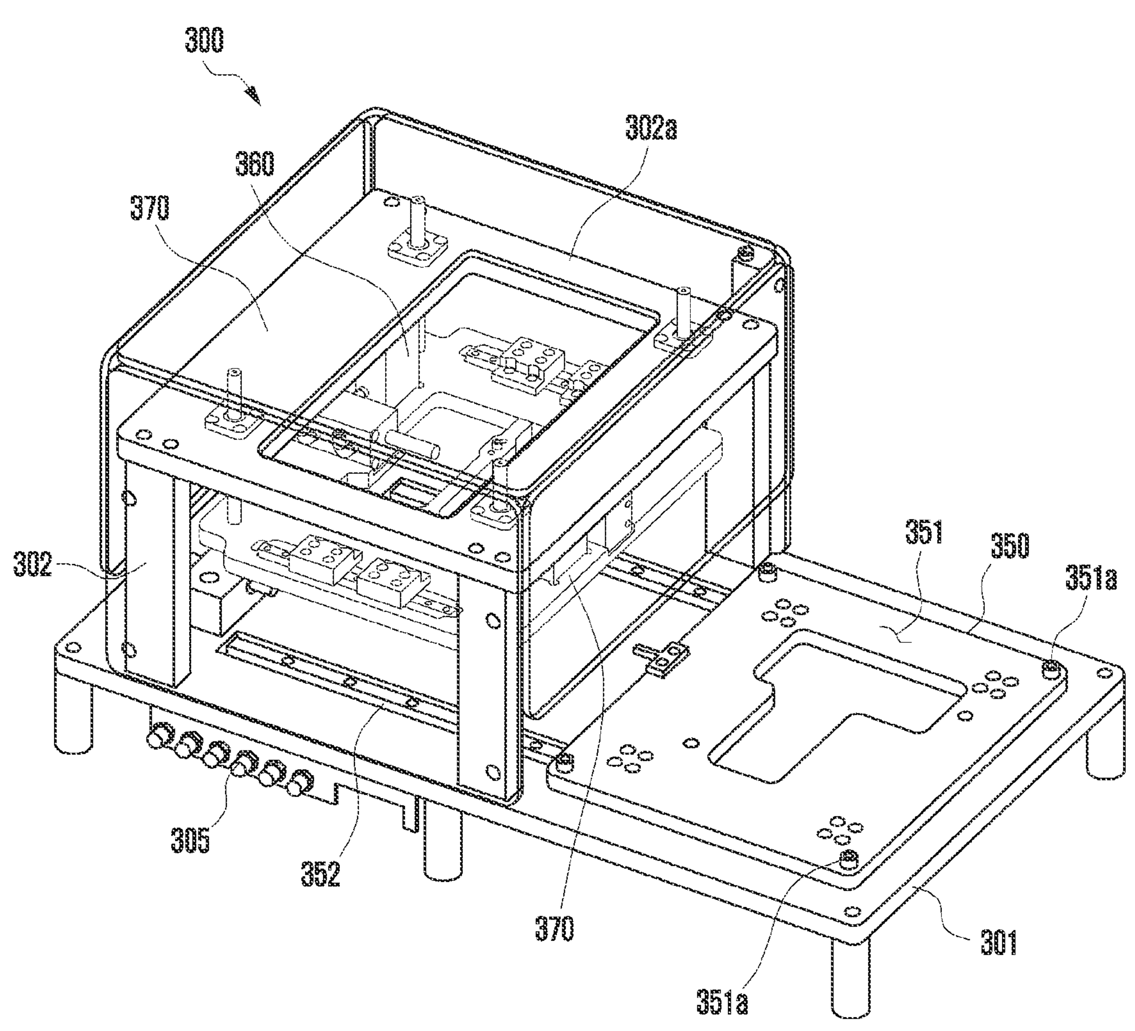
FIG. 9A is a perspective view of a film attachment apparatus according to various embodiments.

FIG. 9A is a perspective view of a film attachment apparatus 300 according to various embodiments.

Figure 9B:
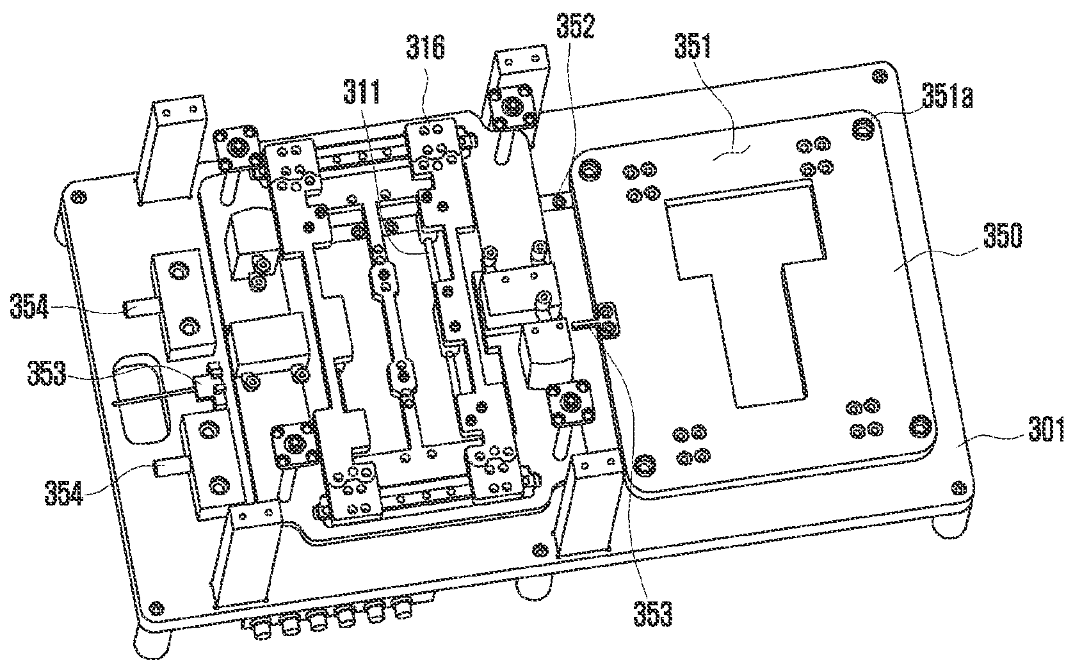
FIG. 9B is an internal perspective view of a film attachment apparatus according to various embodiments.

FIG. 9B is an internal perspective view of a film attachment apparatus 300 according to various embodiments.

Figure 9C:
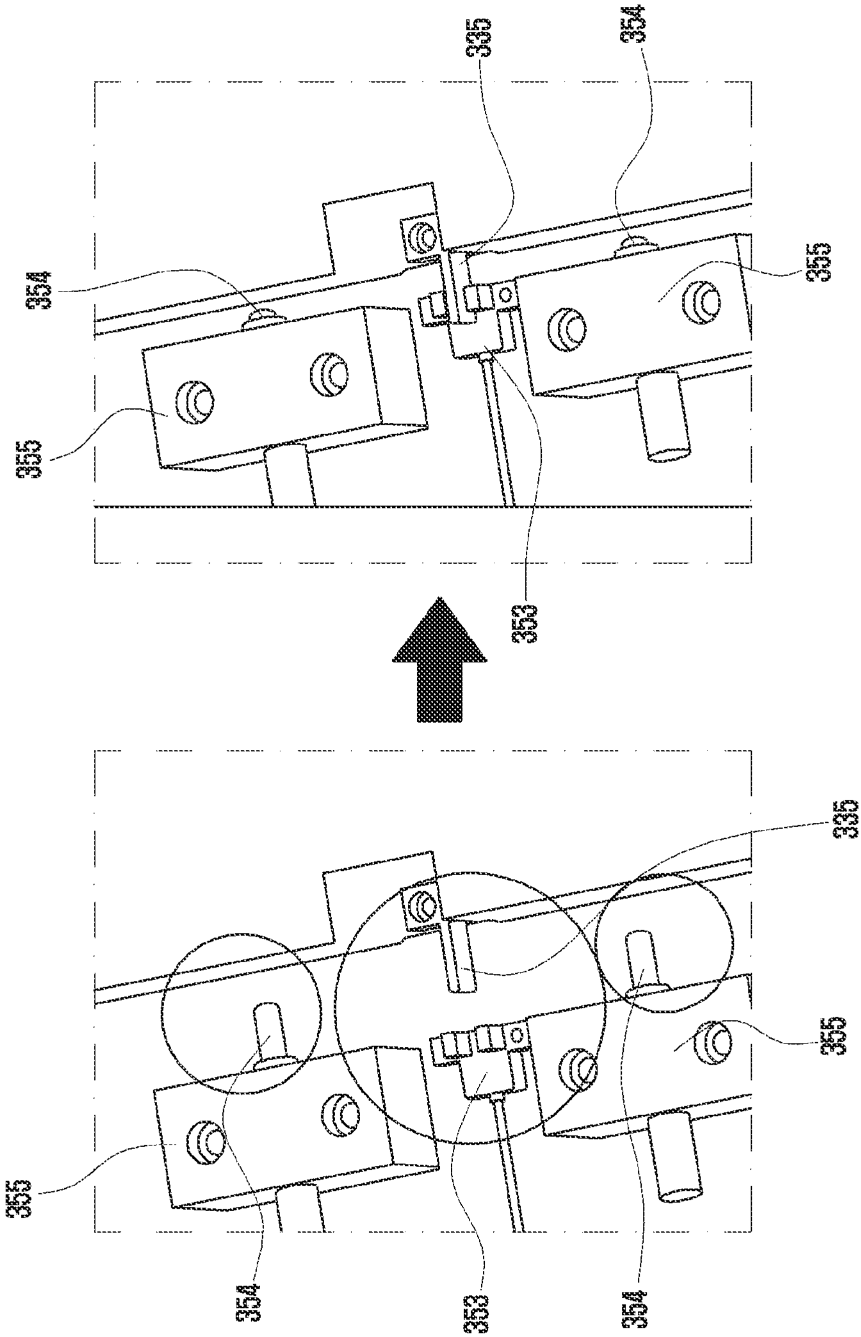
FIG. 9C is a diagram illustrating an enlarged view illustrating a jig sensor and a shock absorber of a film attachment apparatus according to various embodiments.

FIG. 9C is an enlarged view showing a jig sensor 353 and a shock absorber 354 of a film attachment apparatus 300 according to various embodiments.

Referring to FIG. 9A and FIG. 9B, the film attachment apparatus 300 according to various embodiments of the disclosure may include a jig base 350 and a jig rail 352.

The jig base 350 may be a plate-shaped member which is positioned above the foundation 301 and includes a jig seat surface 351 to which the jig 330 is coupled. The jig rail 352 may be a rail which is formed to extend below the roller carriage 310 on the upper surface of the foundation 301 and guides the jig base 350 so that the jig base 350 is inserted into and withdrawn from the lower part of the roller carriage 310. The jig 330 may be slidably coupled to the jig rail 352. Since the jig 330 is coupled to the jig base 350 and the jig base 350 slides and moves below the roller carriage 310 by means of the jig rail 352, it may be easy for an operator to position the housing plate 380 and the film 381 on the jig 330, to transfer the jig 330 below the roller carriage 310, and then to perform the film attachment work.

In various embodiments, the jig base 350 may include a jig fastening part 351*a*, and the jig 330 may be fastened to the jig base 350 using a fastening means which enables quick fastening, for example, a quick change lever, a snap fastener, or a screw. A user can quickly withdraw the jig 330 from the lower part of the roller carriage due to the jig rail 352, and can separate the jig 330 from the jig base 350 by dismantling the fastening means. Therefore, it may be possible to easily replace the jig 330 in response to the shape change of the rear plate of a produced electronic apparatus.

Referring to FIG. 9C, the film attachment apparatus 300 may include a shock absorber 354 and a jig sensor 353. The shock absorber 354 may be a member which absorbs the kinetic energy of the jig 330 and the jig base 350 so that the jig 330 and the jig base 350 stop at a position at which the film attachment work is performed, in case that the operation of inserting the jig 330 and the jig base 350 into the lower part of the roll carriage is completed. The shock absorber 354 may absorb kinetic energy using a frictional force of a fluid passing through an orifice or an electromagnetic induction method. In various embodiments, the shock absorber 354 may be positioned at a side opposite to the direction in which the jig base 350 is inserted, and may be fastened on the surface of the foundation 301 by the shock absorber fixing block 355.

The jig sensor 353 may be a sensor for detecting whether the jig base 350 and the jig 330 are positioned at a suitable position which allows the film attachment work to be performed. The jig sensor 353 may include various position sensors such as an ultrasonic sensor, an electrical contact sensor, an electromagnetic sensor, an optical sensor, and/or a laser sensor. In various embodiments, the jig base 350 may include a sensor detection-aiding part 335 for generating a position signal with respect to the jig sensor 353. Although not illustrated, in an embodiment, the sensor detection-aiding part 335 may be installed on the jig 330. For example, the sensor detection-aiding part 335 may include a magnet, an electromagnet, or the like which reflects ultrasound waves and/or light or generates electromagnetic induction.

Figure 10:
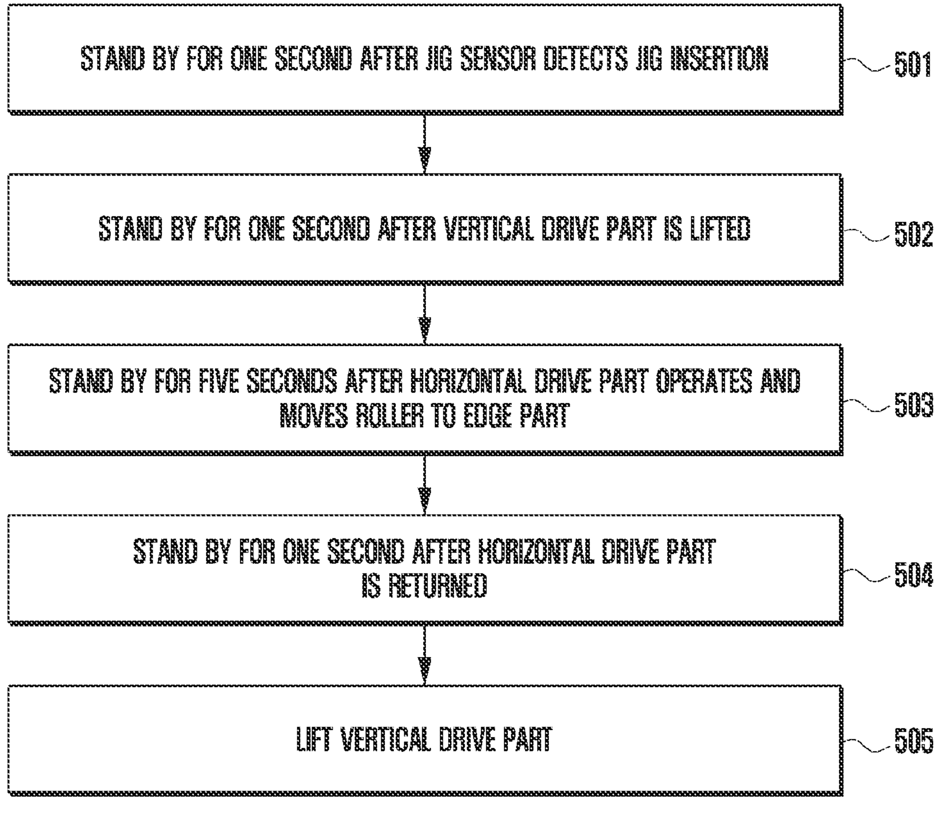
FIG. 10 is a flowchart illustrating an example operation of a film attachment apparatus according to various embodiments.

FIG. 10 is a flowchart illustrating an example operation of a film attachment apparatus 300 according to various embodiments.

Referring to FIG. 10, the film attachment apparatus 300 may perform operations including a jig sensor detection operation 501, a vertical drive part lowering operation 502, a horizontal rolling operation 503, a horizontal drive part return operation 504, and a vertical drive part lifting operation 505.

The jig sensor detection operation 501 may be an operation in which the jig sensor 353 detects the jig 330 and the jig base 350 inserted into the lower part of the roller carriage 310 and transmits a signal for performing the vertical drive part lowering operation 502 and the following operations. The vertical drive part lowering operation 502 may be an operation in which the vertical drive part 360 lowers the lifting/lowering plate 320 and thus the roller 311 is lowered to come into contact with the housing plate 380 seated on the jig 330. The horizontal rolling operation 503 may be an operation in which the horizontal drive part 370 moves the roller carriage 310 toward the edge part of the housing plate 380 and thus the roller 311 attaches the film 381 on the surface of the housing plate 380. Unless contradicted, descriptions of FIG. 8A and FIG. 8B may be referred to for the vertical drive part lowering operation 502 and the horizontal rolling operation 503. The horizontal drive part return operation 504 may be an operation in which the roller carriage 310 is returned by the horizontal drive part 370 and thus the roller 311 is moved from the edge part to the center of the housing plate 380. Although not illustrated, the vertical drive part 360 and the horizontal drive part 370 may include sensors such as an encoder capable of measuring a moving distance of the roller 311. The sensors included in vertical drive part 360 and the horizontal drive part 370 may recognize that the vertical drive part lowering operation 502, the horizontal rolling operation 503, and the horizontal drive part return operation 504 have been ended, and may transmit signals for operations in a later step. The vertical drive part lifting operation 505 may be an operation in which the roller is returned upward in order to withdraw the jig 330 on which the housing plate 380, to which the film has been attached, is seated.

In various embodiments, a standby time period is provided after completion of each of the operations 501, 502, 503, 504, and 505. The standby time period may be a time period to identify the completion of each of the operations and to prepare for performing of the following operations. A standby time period before the horizontal drive part return operation 504 after the horizontal rolling operation 503 may be longer than other standby time periods. For example, the film attachment apparatus 300 may have a standby time period of 5 seconds before performing the horizontal drive part return operation 504 after the horizontal rolling operation 503, and the remaining standby time periods may be one second. In case that the horizontal rolling operation has been completed, the film 381 may be attached to the housing plate 380. Therefore, the roller may press the film to the housing plate 380 for a long standby time period to ensure the attachment of the film. Although not illustrated, the film attachment apparatus 300 may include a control device for automatically performing the above-described operations according to signals from sensors.

The various example disclosed herein including the drawings are merely examples presented to easily describe the technical content according to the disclosure and to aid in understanding of the disclosure, and are not intended to limit the scope of the disclosure. Accordingly, in connection with the scope of various embodiments disclosed herein, it should be understood that not only embodiments disclosed herein but also all changed or modified forms derived based on the technical idea of various embodiments disclosed herein are included in the disclosure, including the appended claims and their equivalents. It will also be understood that any of the embodiment(s) described herein may be used in conjunction with any other embodiment(s) described herein.

What is claimed is:

1. A film attachment apparatus for attaching a film onto a surface of a housing plate of an electronic apparatus, the surface comprising an edge part comprising a curved surface, the film attachment apparatus comprising:

a jig configured to seat and fix the housing plate;

a roller configured to press the film to the housing plate;

a lifting/lowering plate;

a roller carriage rotatably supporting the roller and slidably coupled to the lifting/lowering plate in a direction of the edge part of the housing plate when the jig seats and fixes the housing plate, a vertical actuator coupled to the lifting/lowering plate and configured to move the lifting/lowering plate to move the roller from above the surface of the housing plate, to which the film is attached, and press the roller to the film;

a horizontal actuator coupled to the lifting/lowering plate and configured to move the roller carriage to move the roller in the direction of the edge part of the housing plate;

wherein the roller carriage comprises an elastic member configured to bias the roller towards the housing plate when the jig seats and fixes the housing plate.

2. The film attachment apparatus of claim 1, wherein the film attachment apparatus comprises multiple rollers arranged in parallel, and the horizontal actuator is configured to move the multiple rollers toward multiple edge parts of the housing plate, respectively, the edge parts facing each other.

3. The film attachment apparatus of claim 1, wherein a radius of the roller is less than a radius of curvature of the curved surface of the edge part.

4. The film attachment apparatus of claim 1, wherein the roller comprises a roll body configured to downwardly press the film to the housing plate, and a journal part having a diameter less than a diameter of the roll body and is configured to transmit, to the roller carriage, a reaction force against downward pressing of the roller, and wherein the roller carriage comprises a bearing case surrounding the journal part to support a rotation of the roller, and coupled to the elastic member to support the roller.

5. The film attachment apparatus of claim 4, wherein the roller comprises two journal parts positioned opposite one another at a terminal end of the roller, and wherein the roller carriage comprises bearing cases arranged at positions corresponding to the positions of the journal parts.

6. The film attachment apparatus of claim 4, wherein the roller comprises a plurality of journal parts formed at opposite ends and a middle of the roller and comprises a roll body divided by one of the plurality of journal parts that is positioned at the middle of the roller, and wherein the roller carriage comprises bearing cases arranged at positions corresponding to the positions of the journal parts.

7. The film attachment apparatus of claim 4, wherein the roll body of the roller comprises a core part positioned at a central part of the roller, and an elastic polymer material surrounding an outer circumferential surface of the core part.

8. The film attachment apparatus of claim 1, wherein the roller carriage is detachably fastened to the lifting/lowering plate.

9. The film attachment apparatus of claim 1, comprising a release sheet to which the film is attached, wherein the jig comprises a release sheet guide configured to fix the release sheet in at least one direction on a plane, and wherein the release sheet includes a guide hole disposed in an area corresponding to the release sheet guide in a perimeter part of the film.

10. The film attachment apparatus of claim 9, wherein the guide hole of the release sheet comprises a lengthened hole extending in a direction in which the roller is configured to move based on the film being attached, and wherein the release sheet includes a perforated line formed by cutting an edge of the lengthened hole in a direction from an inside of the lengthened hole to an outside of the release sheet.

11. The film attachment apparatus of claim 1, comprising a jig base positioned below the jig and to which the jig is detachably fastened.

12. The film attachment apparatus of claim 11, comprising a jig rail configured to slide the jig base and the jig fastened to the jig base to be inserted into and withdrawn from a lower part of the roller.

13. The film attachment apparatus of claim 12, comprising:

a shock absorber configured to contact the jig based on the jig base being inserted into the lower part of the roller and configured to absorb kinetic energy of sliding-motion of the jig base to stop the jig base and absorb a stop impact of the jig; and a jig sensor configured to recognize the jig inserted into the lower part of the roller, wherein the jig base comprises a sensor detection-aiding part recognized by the jig sensor.

* * * * *